United States Patent [19]

Asakura et al.

[11] Patent Number: 5,565,944
[45] Date of Patent: Oct. 15, 1996

[54] CAMERA

[75] Inventors: Yasuo Asakura; Masatoshi Sato, both of Hachioji, Japan

[73] Assignee: Olympus Optical Co., Ltd., Tokyo, Japan

[21] Appl. No.: 309,394

[22] Filed: Sep. 20, 1994

[30] Foreign Application Priority Data

Sep. 21, 1993 [JP] Japan .................................. 5-235185

[51] Int. Cl.⁶ .................................................. G03B 1/18
[52] U.S. Cl. ...................... 396/284; 242/333.4; 226/45; 396/310
[58] Field of Search .................... 354/105, 106, 354/173.1; 250/235, 227.21, 222.26, 223, 236; 242/333, 333.4; 276/45; 33/734, 739, 746, 735, 791, 792

[56] References Cited

U.S. PATENT DOCUMENTS

| | | | |
|---|---|---|---|
| 4,554,560 | 11/1985 | Kanaoka et al. | 346/108 |
| 4,980,549 | 12/1990 | Baldwin | 250/235 |
| 5,182,590 | 1/1993 | Kaihara et al. | 354/105 |
| 5,184,246 | 2/1993 | Schwartz et al. | 359/216 |
| 5,328,072 | 7/1994 | Ruessmann et al. | 226/15 |
| 5,359,460 | 10/1994 | Urakawa | 359/855 |
| 5,398,090 | 3/1995 | Ezawa | 354/173.1 |
| 5,426,477 | 6/1995 | Kume et al. | 354/106 |
| 5,502,602 | 3/1996 | Shimizu et al. | 360/73.14 |

FOREIGN PATENT DOCUMENTS 57-99629  8/1982  Japan .

*Primary Examiner*—Michael L. Gellner
*Assistant Examiner*—Daniel Chapik
*Attorney, Agent, or Firm*—Louis Weinstein

[57] ABSTRACT

A film feeding amount detection apparatus of a camera includes a roller device which rotates in a driven manner with respect to the movement of a film, a reflecting device which shares the use of the rotation shaft with the roller device and which is formed into a polygonal pillar shape such that a plurality of reflecting surfaces are formed on the outer periphery of the rotation shaft, and a light projection and receiving device, which is disposed at a position facing the reflecting surfaces formed on the reflecting device, for projecting light to the reflecting surface portion and receiving light reflected back therefrom.

30 Claims, 32 Drawing Sheets

CAMERA

BACKGROUND OF THE INVENTION

1. Field of the Invention

The present invention relates to a camera and, more particularly, to a camera equipped with a film feeding amount detection apparatus.

2. Description of the Related Art

Hitherto, in Japanese Patent Laid-Open No. 57-99629, a record imprinting apparatus is disclosed for detecting the amount of film fed by using sprocket holes and imprinting data when the film is fed.

However, in the above technical means, since sprocket holes are used as means for detecting the amount of film fed, the diameter of the sprockets is great, and thus the camera becomes enlarged and its cost increases. Also, since a means for generating pulse signals is required because of the rotation of the sprockets, the camera inevitably becomes enlarged and its cost increases.

Hitherto, a means is known for detecting the amount of film fed by a combination of a large saw-tooth disk and an photointerruptor. However, a large space is required for such technical means. Also, to detect more accurately the amount of film which is fed (to have higher resolution) in the above technical means, it is necessary to increase the rotational speed of the disk. In addition, when gears are used, the problem of backlash arises.

SUMMARY OF THE INVENTION

It is a first object of the present invention to provide a camera which is simple in construction, small in size and has a film feeding amount detection apparatus with highly accurate detection capability.

It is a second object of the present invention to provide a camera which is simple in construction and which has a highly accurate data imprinting apparatus.

In brief, the film feeding amount detection apparatus of the camera in accordance with the present invention comprises roller means which are rotated in a driven manner with respect to the movement of a film; reflecting means which share the use of the rotation shaft with the roller means and which is formed into a polygonal pillar shape such that a plurality of reflecting surfaces are formed on the outer periphery of the rotation shaft; and light projection and receiving means, which is disposed at a position facing the reflecting surfaces formed on the reflecting means, for projecting light to the reflecting surface portion and receiving light reflected back therefrom.

These as well as other objects and advantages of the present invention will become further apparent from the following detailed explanation.

DETAILED DESCRIPTION OF THE PREFERRED EMBODIMENT

A preferred embodiment of the present invention will be explained below with reference to the accompanying drawings.

Figure 1:
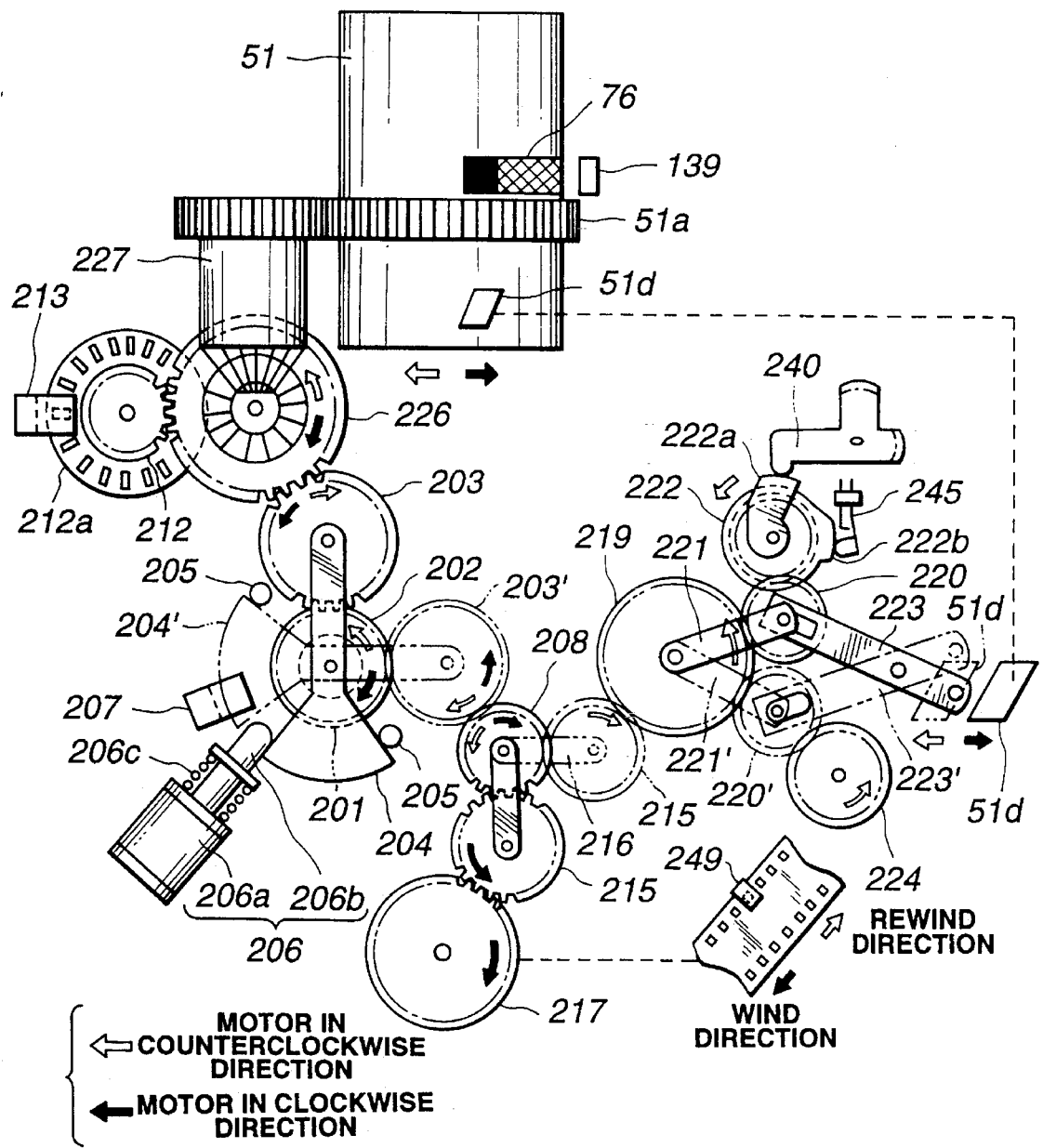
FIG. 1 is a schematic diagram illustrating the essential portion of a camera in accordance with one embodiment of the present invention.
Figure 2:
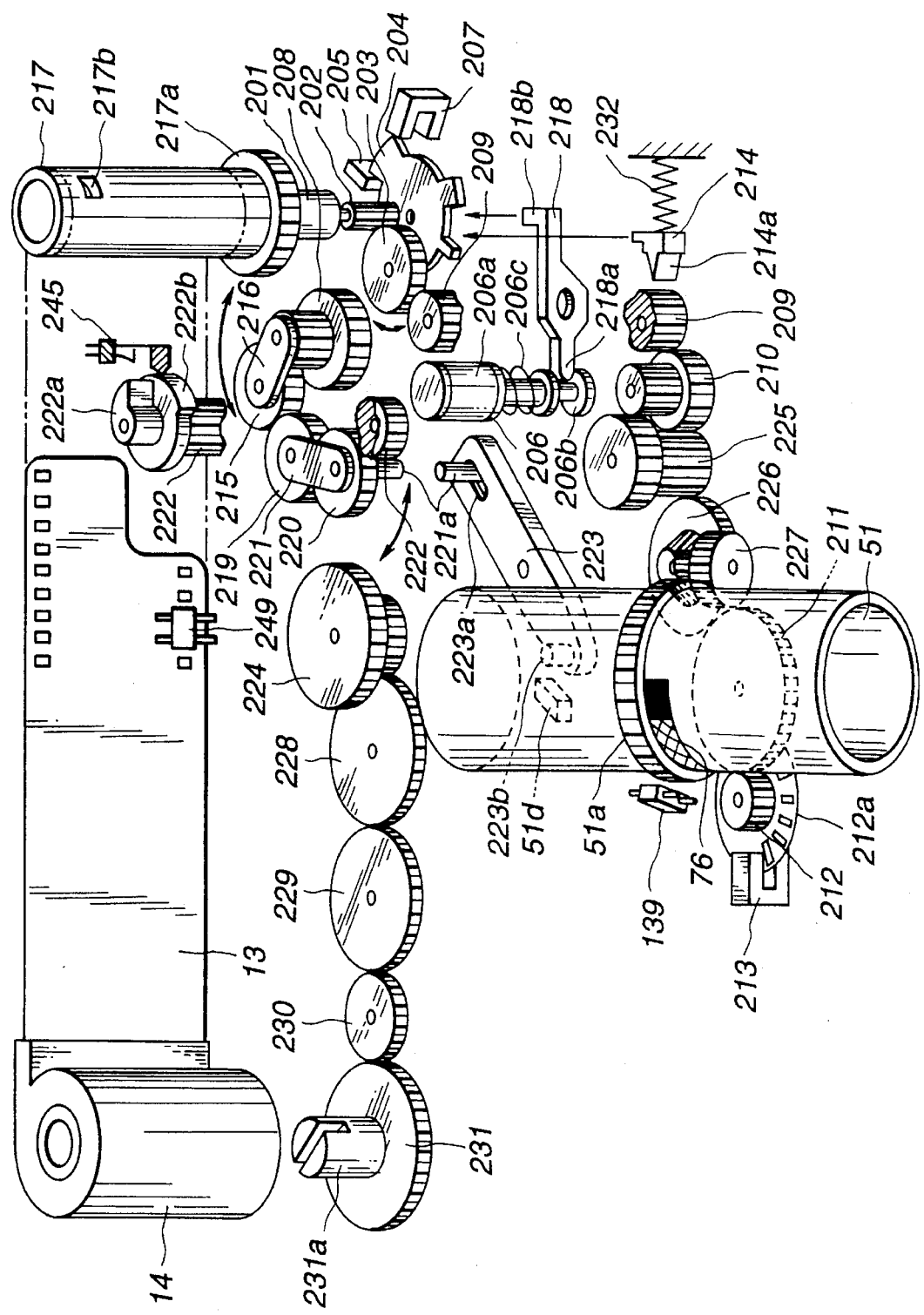
FIG. 2 is a perspective view illustrating the essential portion of the camera in accordance with the embodiment of the present invention.
Figure 3:
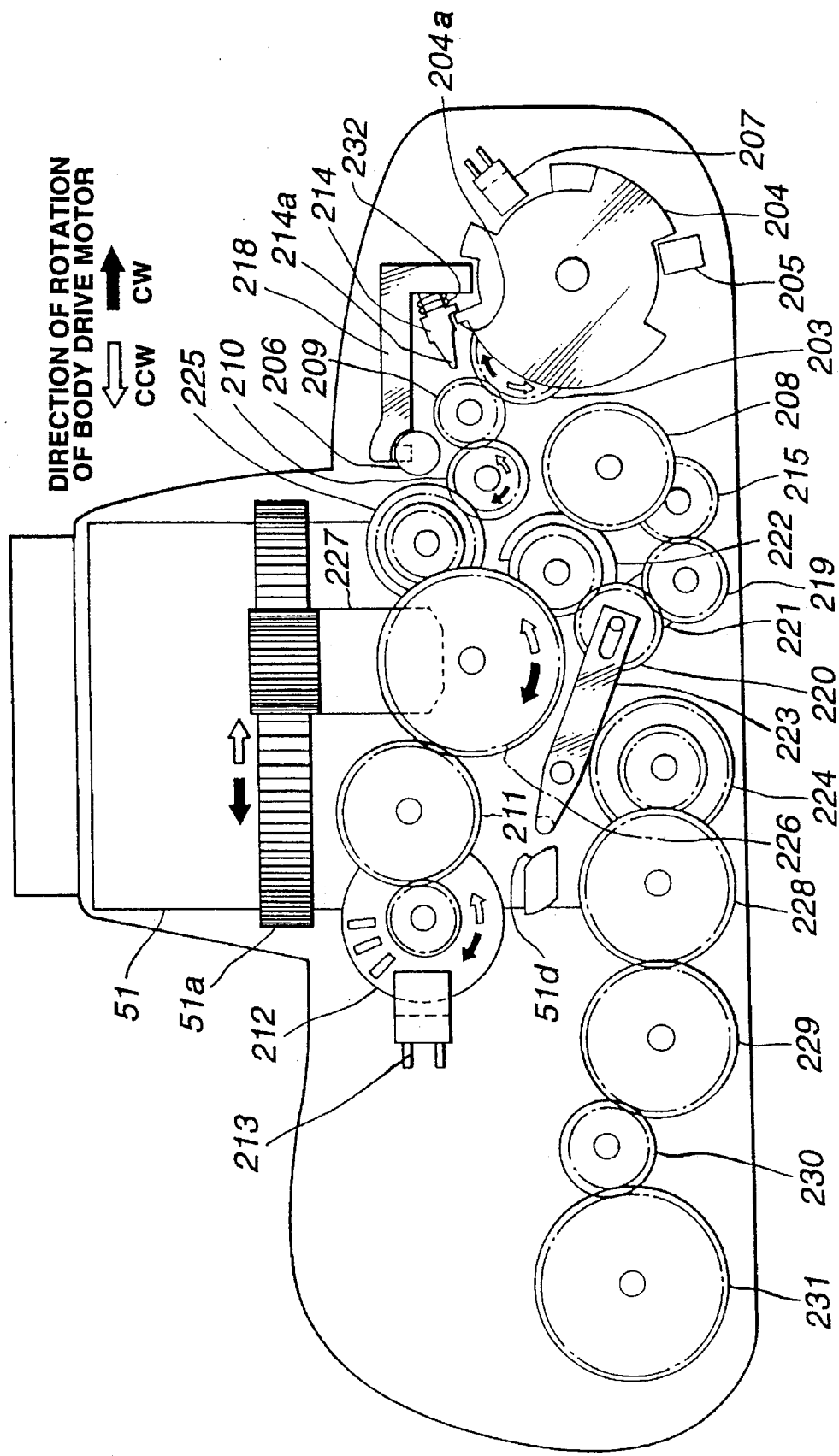
FIG. 3 is a plan view illustrating the main gear trains when a zooming operation is possible in the camera in accordance with the embodiment of the present invention.
Figure 4:
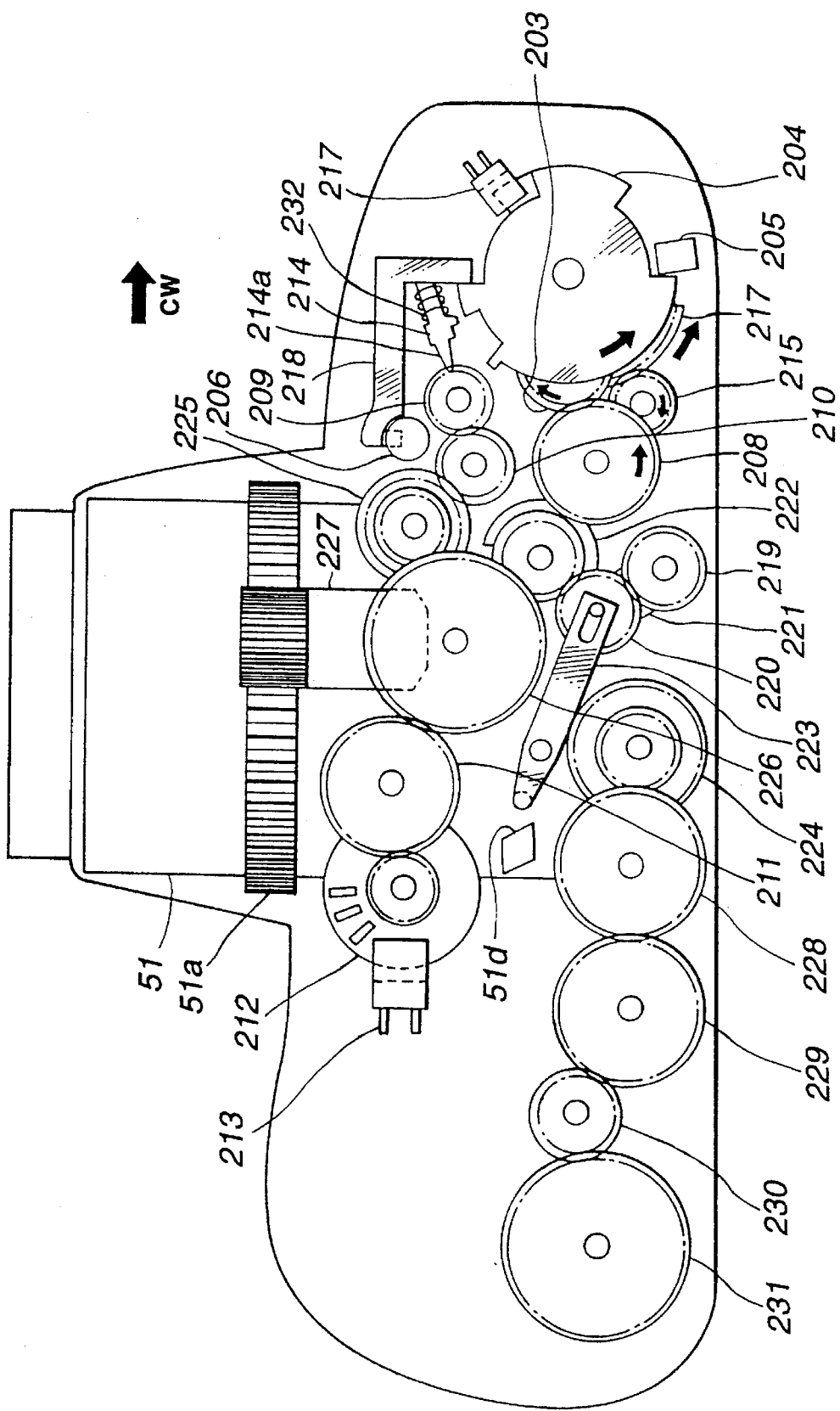
FIG. 4 is a plan view illustrating the main gear trains when a film winding operation is possible in the camera in accordance with the embodiment of the present invention.
Figure 5:
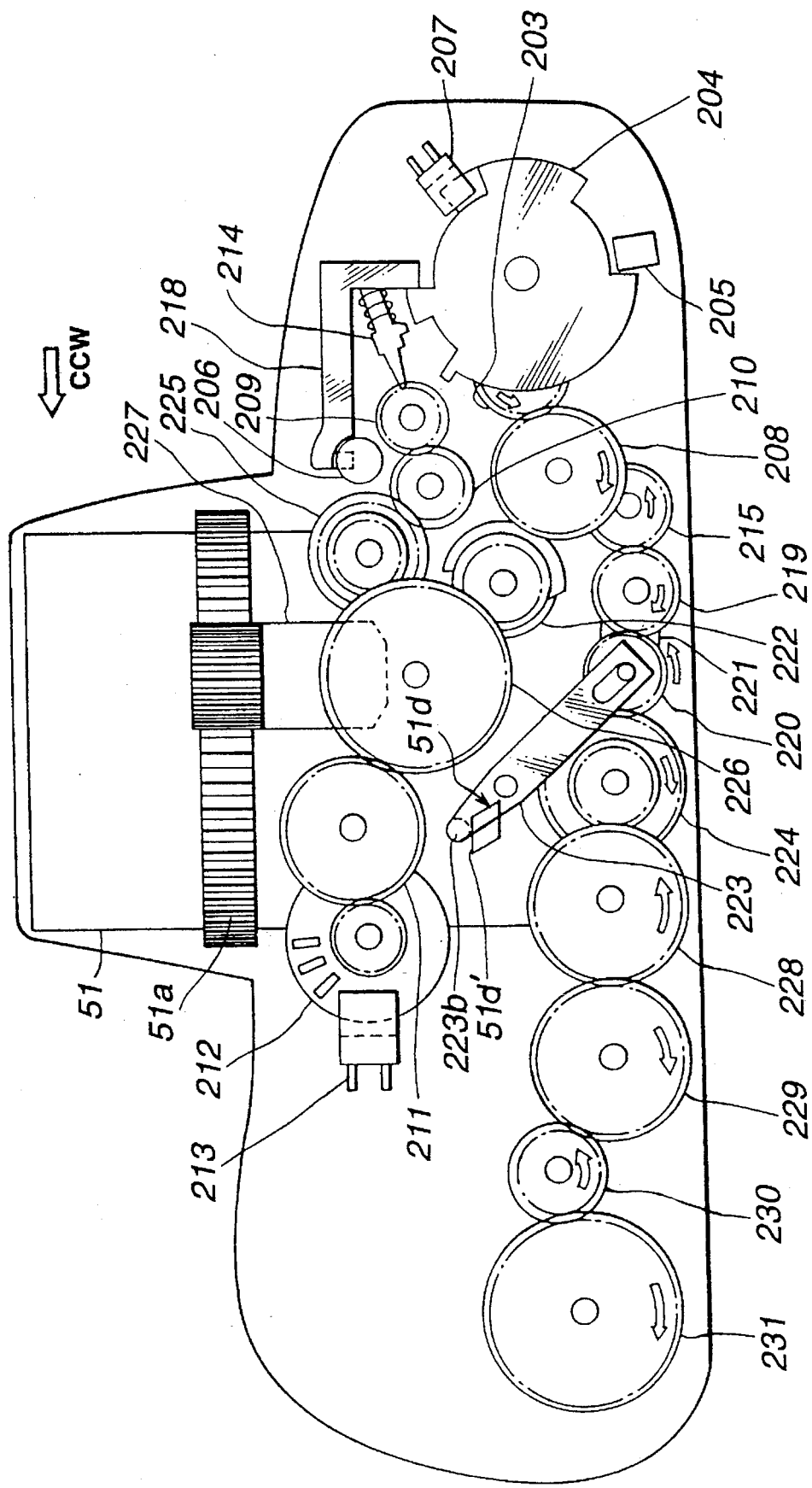
FIG. 5 is a plan view illustrating the main gear trains when a film rewinding operation is possible in the camera in accordance with the embodiment of the present invention.
Figure 6:
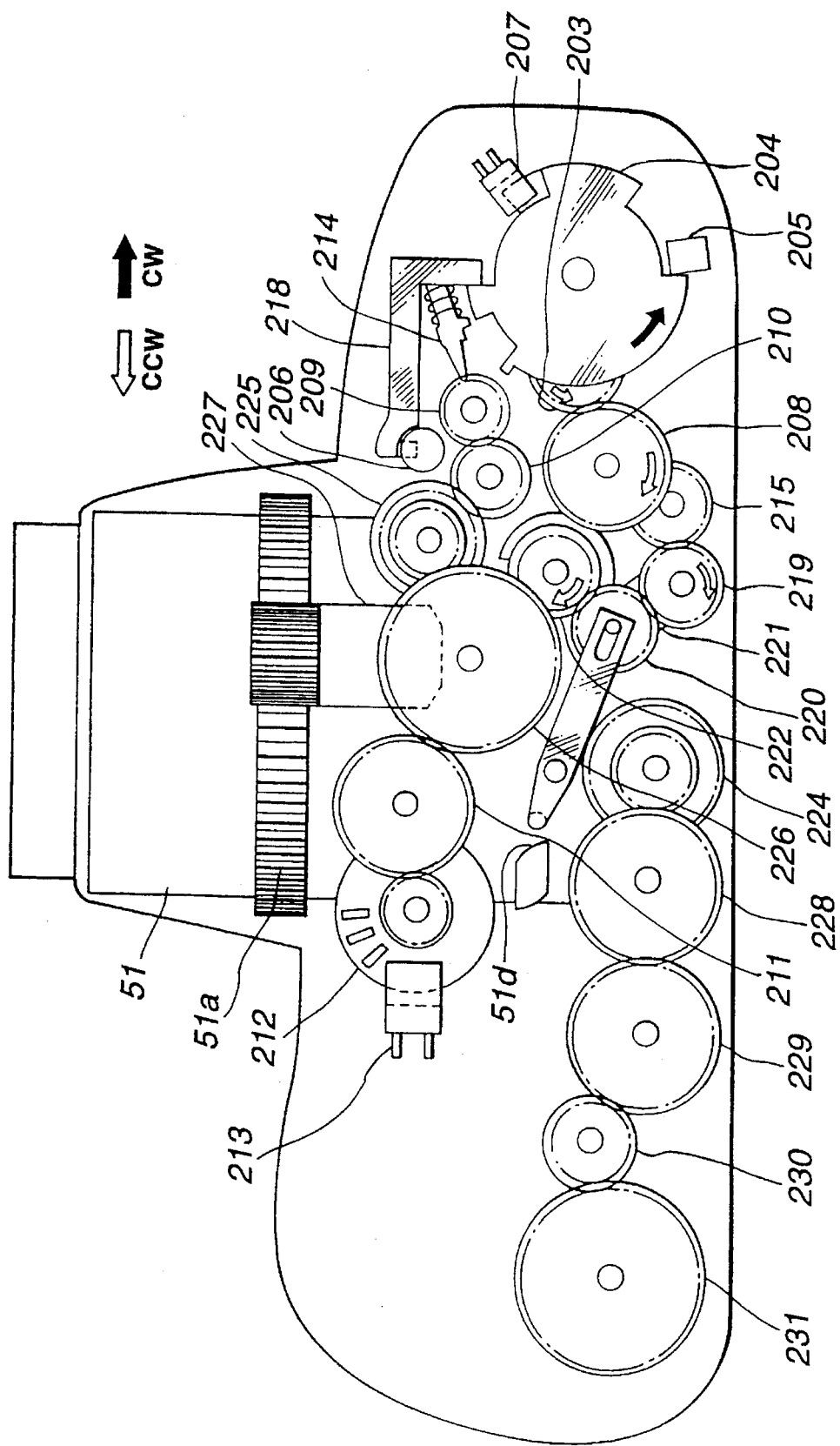
FIG. 6 is a plan view illustrating the main gear trains when a photographic image-plane size switching operation is possible in the camera in accordance with the embodiment of the present invention.

FIG. 1 is a schematic diagram illustrating the essential portion of a camera in accordance with one embodiment of the present invention. FIG. 2 is a perspective view illustrating the essential portion of the camera. FIGS. 3 to 6 are plan views illustrating the main gear trains in a state in which the essential portions of the camera are each operating. FIG. 3 illustrates the state when the zooming operation is possible. FIG. 4 illustrates the state when the film winding operation is possible. FIG. 5 illustrates the state when the film rewinding operation is possible. FIG. 6 illustrates the state when the photographic image-plane size switching operation is possible.

In the camera of this embodiment, as shown in FIG. 2, a body drive motor 201 is disposed inside a spool 217, as is known. In FIG. 1, for the sake of explanation, the body drive motor 201 and the spool 217 are shown separately and spaced apart. The body drive motor 201 is rotatable in the clockwise and counterclockwise directions. A sun gear 202 is mounted in the body drive motor 201 in such a way that the sun gear 202 coincides with the rotational center of the body drive motor 201. A planetary gear 203 is supported so as to always engage the sun gear 202. The carrier 204 is disposed at a position at which the rotational center thereof coincides with that of the body drive motor 201 and rotatably supports the planetary gear 203 so as for it to have a frictional force applied by sun gear 202.

A stopper 205 is a fixed member for regulating i.e. limiting the rotational angle of the carrier 204, and a switching plunger 206 is an actuator formed of a coil 206a, a plunger iron core 206b and a plunger spring 206c, which regulates the rotation of the carrier 204.

The coil 206a is usually not supplied with electric current, and the plunger iron core 206b is urged by the plunger spring 206c and pops up, and the carrier 204 is held between the stopper 205 and the plunger iron core 206b. When, on the other hand, electric current is supplied to the coil 206a, the plunger iron core 206b is attracted to the coil 206a, the held state of the carrier 204 is released, and the carrier 204 becomes rotatable by the driving force of the body drive motor 201 within the range of the regulation permitted by the stopper 205.

When the supply of electric current to the coil 206a is stopped at the time when the carrier 204 is rotated to the vicinity of the rotational limit by the stopper 205, the plunger iron core 206b pops up by the urging force of the plunger spring 206c, causing the carrier 204 to be held between the stopper 205 and the plunger iron core 206b so that the rotation of the carrier 204 is regulated.

Based on the above-described operation, the planetary gear 203 is selectively engaged with either one of a first zoom gear 209 which will be described later and a sun gear 208.

A carrier photointerruptor 207 (hereinafter referred to as the carrier PI 207) is a photointerruptor for detecting the position of the carrier 204, and the winding sun gear 208 engages the planetary gear 203 when the body drive motor 201 rotates in the clockwise direction and the carrier 204 is rotated.

The first zoom gear 209 engages the planetary gear 203 when the body drive motor 201 rotates in the counterclockwise direction and the carrier 204 rotates. A second zoom gear 210, a third zoom gear 225, a fourth zoom gear 226, and a fifth zoom gear 227 rotate in a driven manner with respect to the rotation of the first zoom gear 209.

The second zoom gear 210 and the third zoom gear 225 are formed of a double spur gear, and either one of the fourth zoom gear 226 and the fifth zoom gear 227 is formed of a double gear which is a straight bevel gear so that the direction of the rotation is changed. The other gear of the fifth zoom gear 227 is a spur gear which engages a gear 51a of a rotation frame 51 to cause the rotation frame 51 to rotate.

A zoom photointerruptor idle gear (hereinafter abbreviated as a zoom PI idle gear) 211 is a gear which is driven by the fourth zoom gear 226. A zoom photointerruptor gear (hereinafter abbreviated as a zoom PI gear) 212 is driven by the zoom PI idle gear 211 and formed with a slit 212a.

A zoom photointerruptor (hereinafter abbreviated as a zoom PI) 213 reads pulse signals on the basis of the rotation of the slit 212a of the zoom PI gear 212, thereby detecting the amount of rotation of the rotation frame 51.

A non-return member 214 is urged toward the first zoom gear 209 by a non-return spring 232, and the tip thereof is formed with a claw 214a tapered toward the tip. The claw 214a of the non-return member 214 thrusts between the gear teeth of the first zoom gear 209 when the planetary gear 203 engages the sun gear 208, thereby preventing the rotation frame 51 from inadvertently rotating by an external force.

When the planetary gear 203 engages the first zoom gear 209, the non-return member 214 is disengaged from the first zoom gear 209 by a claw 204a (FIG. 3) of the carrier 204 so that the rotation frame 51 becomes rotatable freely.

A winding planetary gear mechanism 215 is connected and supported by a winding carrier 216 so that the winding planetary gear mechanism 215 is always engaged with the winding sun gear 208. That is, the winding carrier 216 is disposed in a state in which the rotational center of the winding carrier 216 coincides with that of the winding sun gear 208, and the winding carrier 216 supports the winding planetary gear 215 so as for it to have a frictional force due to sun gear 208.

The above-described spool 217 has the body drive motor 201 disposed therein, and a gear 217a is formed on the outer peripheral surface in the lower portion of the spool 217. When the body drive motor 201 is rotated in the clockwise direction, the winding carrier 216 rotates toward the spool 217 side, and the winding planetary gear 215 is engaged with the gear 217a of spool 217 and rotated. Further, a claw 217b which engages the perforations of the film is protrusively formed on the outer peripheral surface in the upper portion of the spool 217. The rotation of the spool 217 enables the film to be taken up.

A locking lever 218 is supported in the middle of both ends thereof in such a manner as to be rockable so that one of the arm portions, 218a, of an locking lever 218 engages the flanges of the plunger iron core 206b of the switching plunger 206, and the other arm portion 218b selectively locks the carrier 204. When the plunger iron core 206b is attracted to the coil 206a, the locking of the carrier 204 is released.

A panoramic sun gear 219 engages the winding planetary gear 215 when the body drive motor 201 rotates in the counterclockwise direction while the planetary gear 203 is engaged with the sun gear 208. A panoramic planetary gear 220 is supported so as to be always engaged with the panoramic sun gear 219. A panoramic carrier 221 is disposed at a position at which the rotational center thereof matches that of the panoramic sun gear 219 and supports the panoramic planetary gear 220 so as for it to have a frictional force due to sun gear 219, and a shaft 221a which is the rotational center of the panoramic planetary gear 220 and which extends below the panoramic planetary gear 220 is formed.

A cam gear 222 is a gear for switching a photographic image-plane size. When the body drive motor 201 is rotated in the counterclockwise direction while the planetary gear 203 is engaged with the sun gear 208, the winding carrier 216 rotates toward the panoramic sun gear 219 side, the winding planetary gear 215 engages the panoramic sun gear 219 so that the panoramic sun gear 219 is rotated. The rotation of the panoramic sun gear 219 causes the panoramic carrier 221 to rotate toward the cam gear 222 side, the panoramic planetary gear 220 and the cam gear 222 are engaged with each other and these gears are rotated.

A second cam 222b for actuating an image-plane size detection switch 245 for detecting the state of two light-shielding masks 242 and 243 (FIG. 7) is formed in the upper portion of the cam gear 222, and the first cam 222a for actuating the two light-shielding masks 242 and 243 is formed further above the second cam 222b.

In a switching lever 223, a groove 223a which is formed in one of the arm portions of the switching lever 223, engages the shaft 221a for supporting the panoramic planetary gear 220, of the panoramic carrier 221. A projection 223b is protrusively provided in the other end portion of the switching lever 223. The projection 223b is brought into contact with a cam 51d, formed in the rotation frame 51, as a result of the rotation of the rotation frame 51.

The switching lever 223 is rotatably supported by the fulcrum shaft in the middle thereof and is rotated by the rotation of the cam 51d of the rotation frame 51 in the other arm end and causes the panoramic carrier 221, which is engaged with one arm end portion, to be rotated. As a result, the panoramic planetary gear 220 engages a first rewinding gear 224.

On the other hand, when the cam 51d of the rotation frame 51 is spaced from the projection 223b, the switching lever 223 is operatively associated with the panoramic carrier 221.

The first rewinding gear 224, a second rewinding gear 228, a third rewinding gear 229, a fourth rewinding gear 230 and a fifth rewinding gear 231 are each operatively associated with the rotation of the panoramic planetary gear 220. The first rewinding gear 224 is formed of a double spur gear, the fifth rewinding gear 231 is disposed in a state in which the rotational center thereof coincides with that of the spool shaft (not shown) within the cartridge 14 (FIG. 2) and is provided with a fork 231a for rewinding a film by rotating the spool shaft (not shown).

FIGS. 7 to 17 are illustrations of a panorama switching mechanism of this embodiment.

Figure 7:
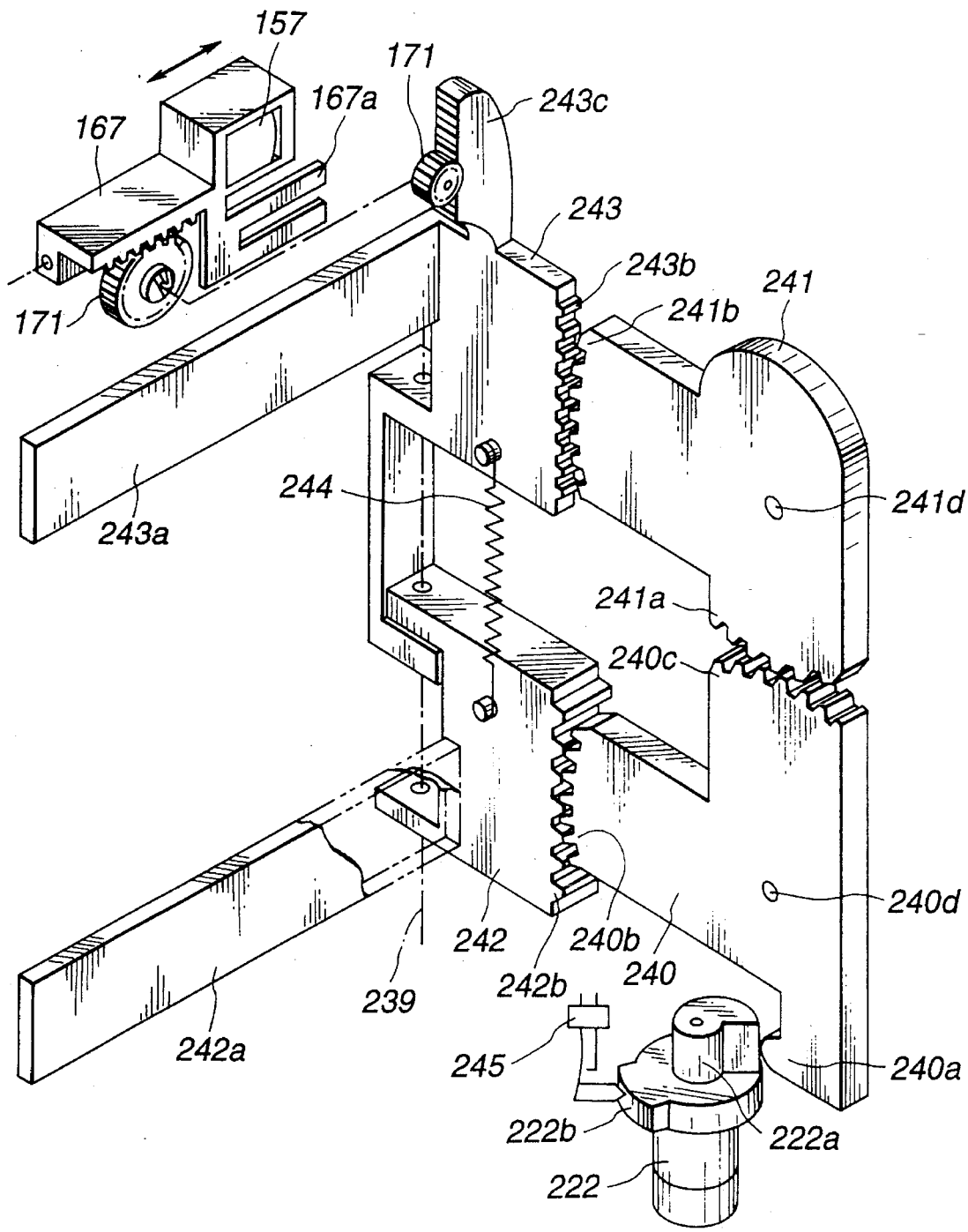
FIG. 7 is a perspective view illustrating the overall panorama switching mechanism in the camera in accordance with the embodiment of the present invention.
Figure 12:
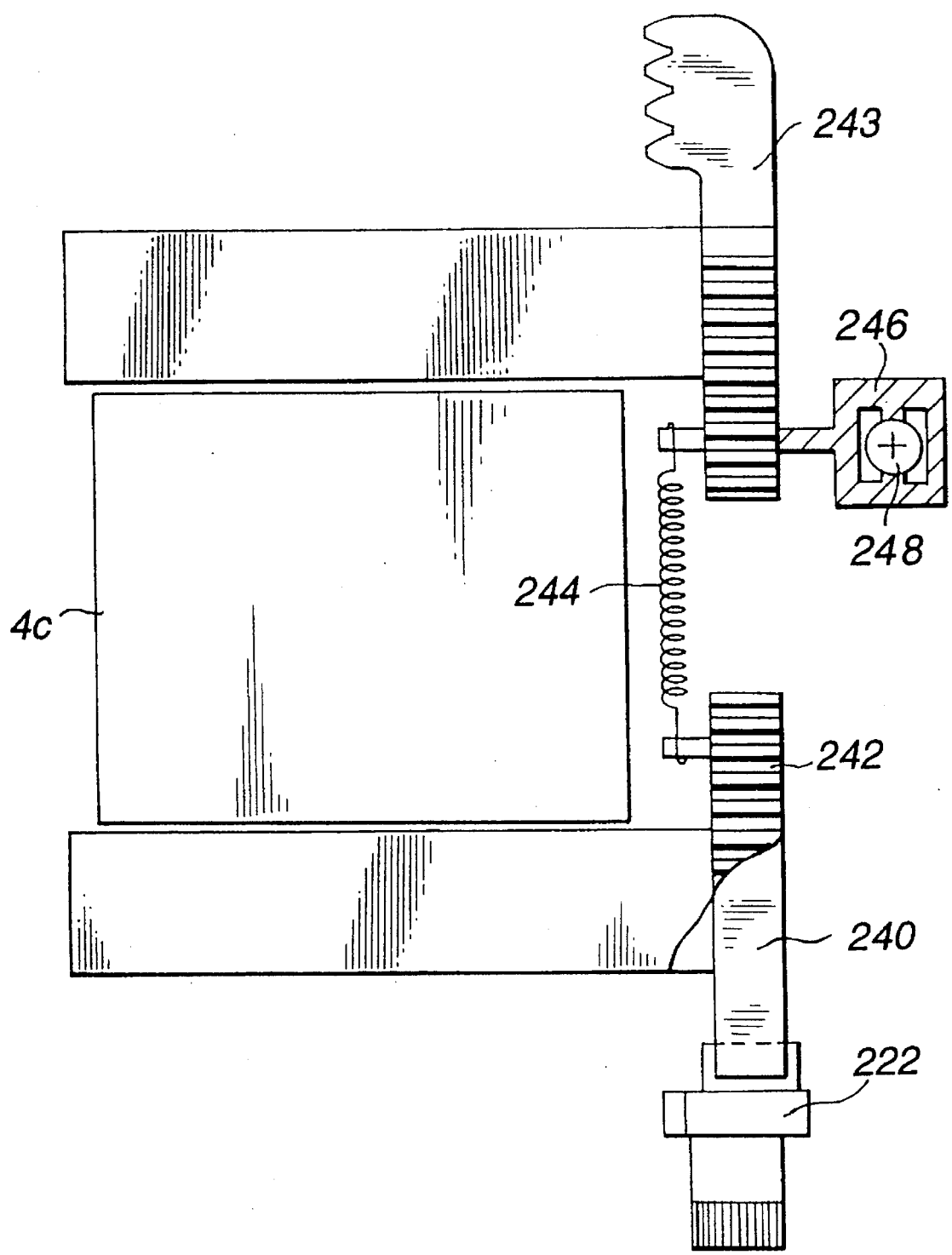
FIG. 12 is a front view illustrating the essential portion of the panorama switching mechanism in a state in which a wide photographic image-plane size is selected in the camera in accordance with the embodiment of the present invention.
Figure 13:
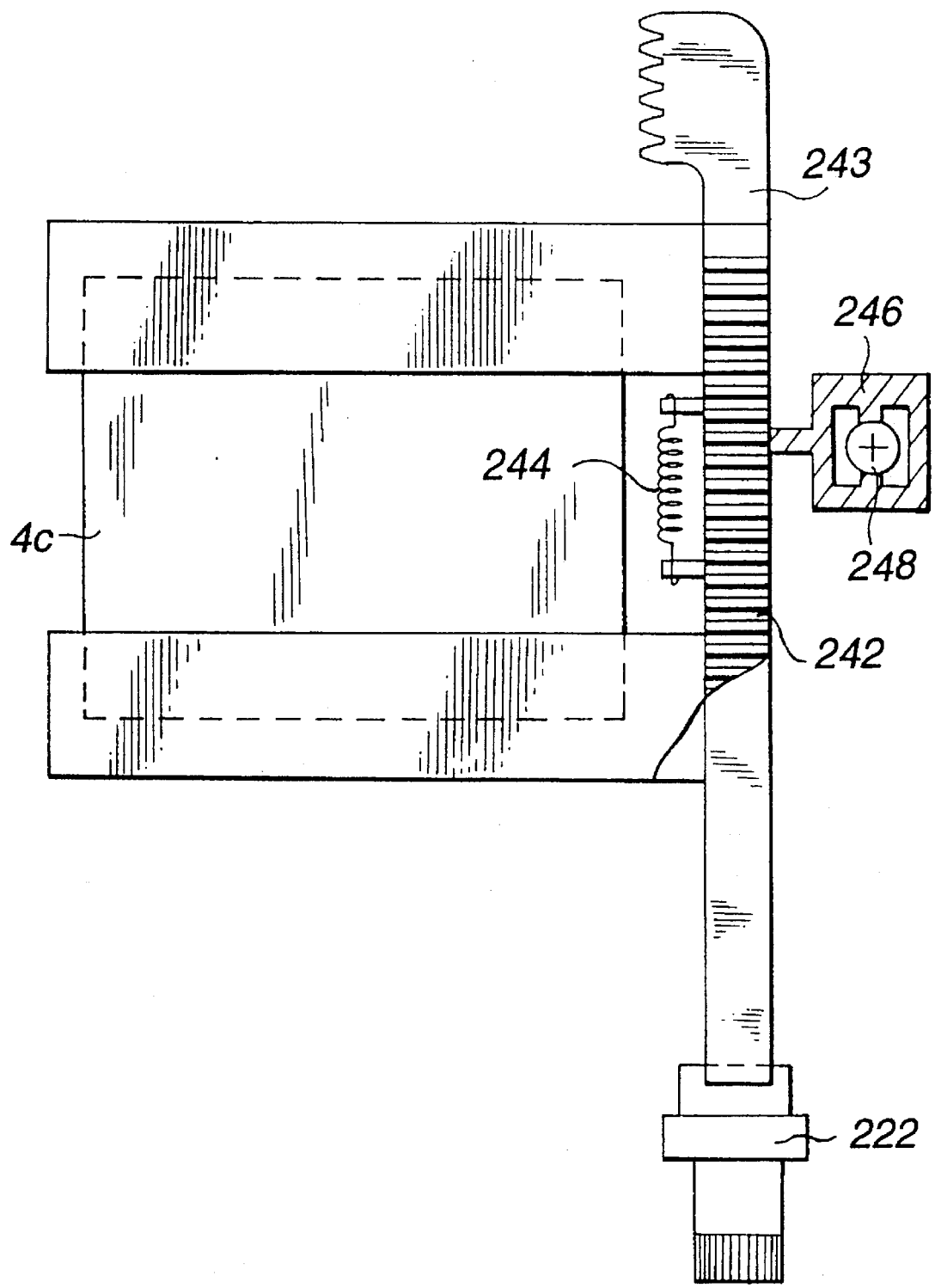
FIG. 13 is a front view illustrating the essential portion of the panorama switching mechanism in a state in which a narrow photographic image-plane size is selected in the camera in accordance with the embodiment of the present invention.
Figure 14:
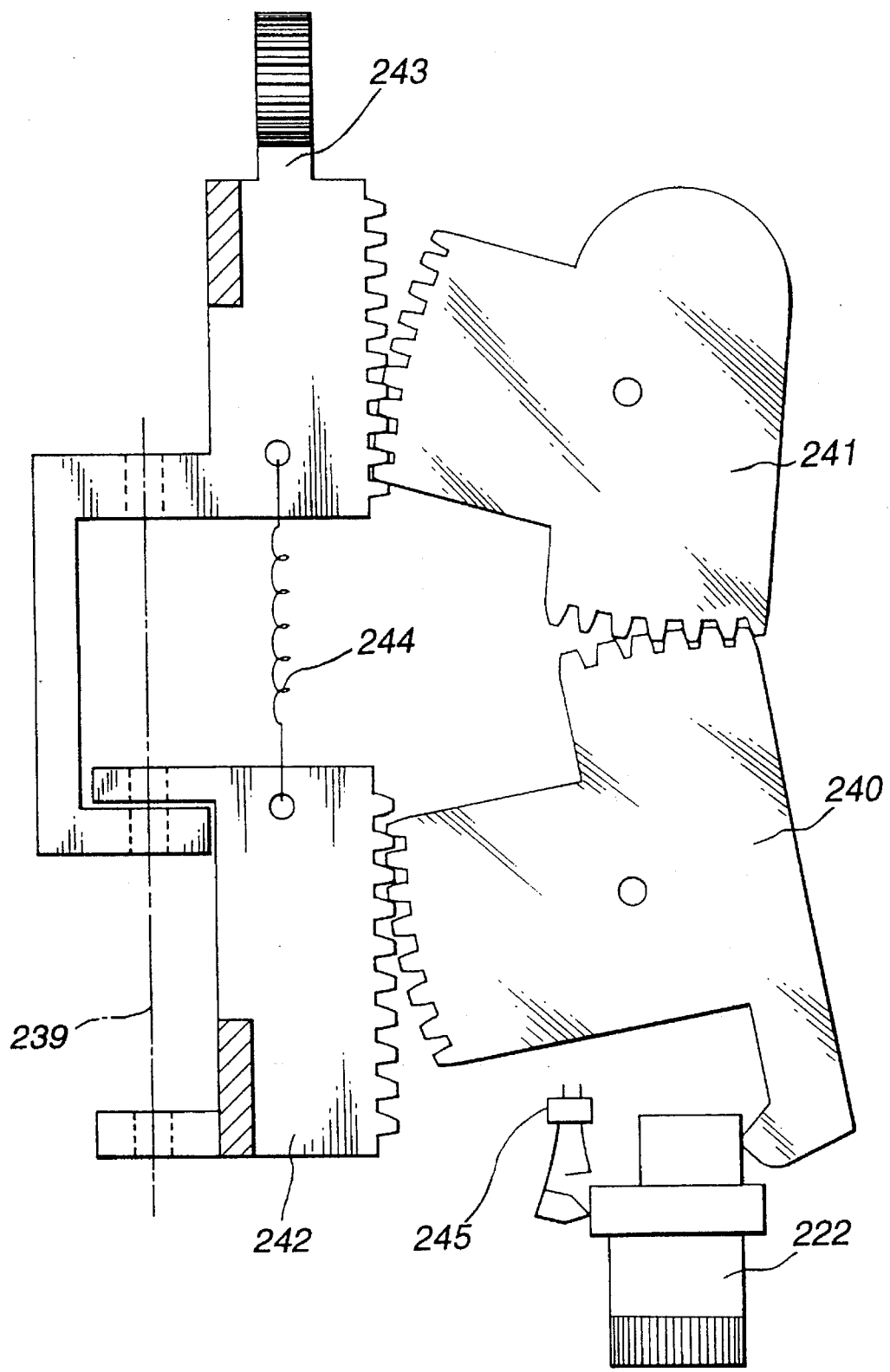
FIG. 14 is a side view illustrating the essential portion of the panorama switching mechanism in a state in which a wide photographic image-plane size is selected in the camera in accordance with the embodiment of the present invention.
Figure 15:
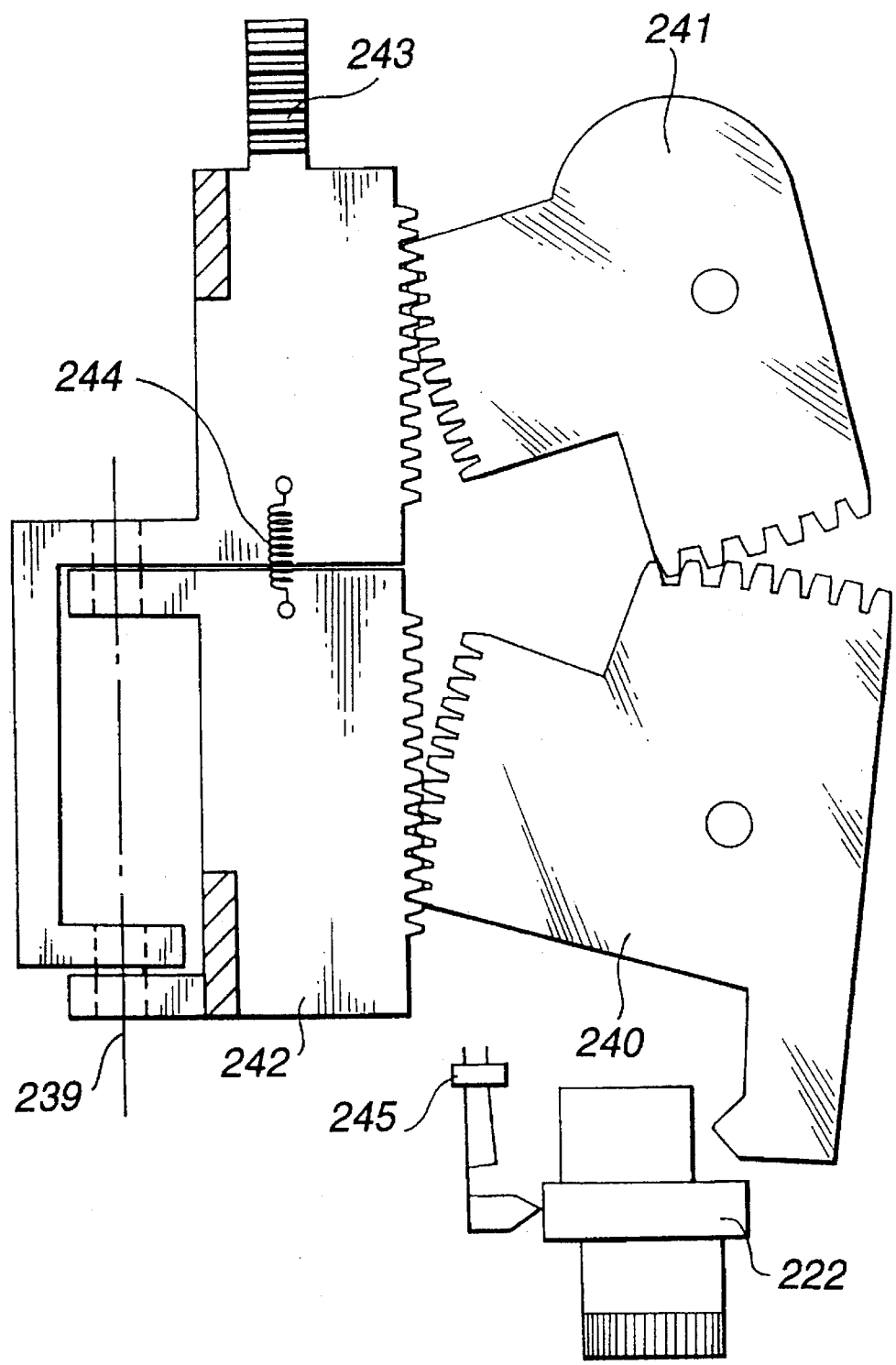
FIG. 15 is a side view illustrating the essential portion of the panorama switching mechanism in a state in which a narrow photographic image-plane size is selected in the camera in accordance with the embodiment of the present invention.
Figure 16:
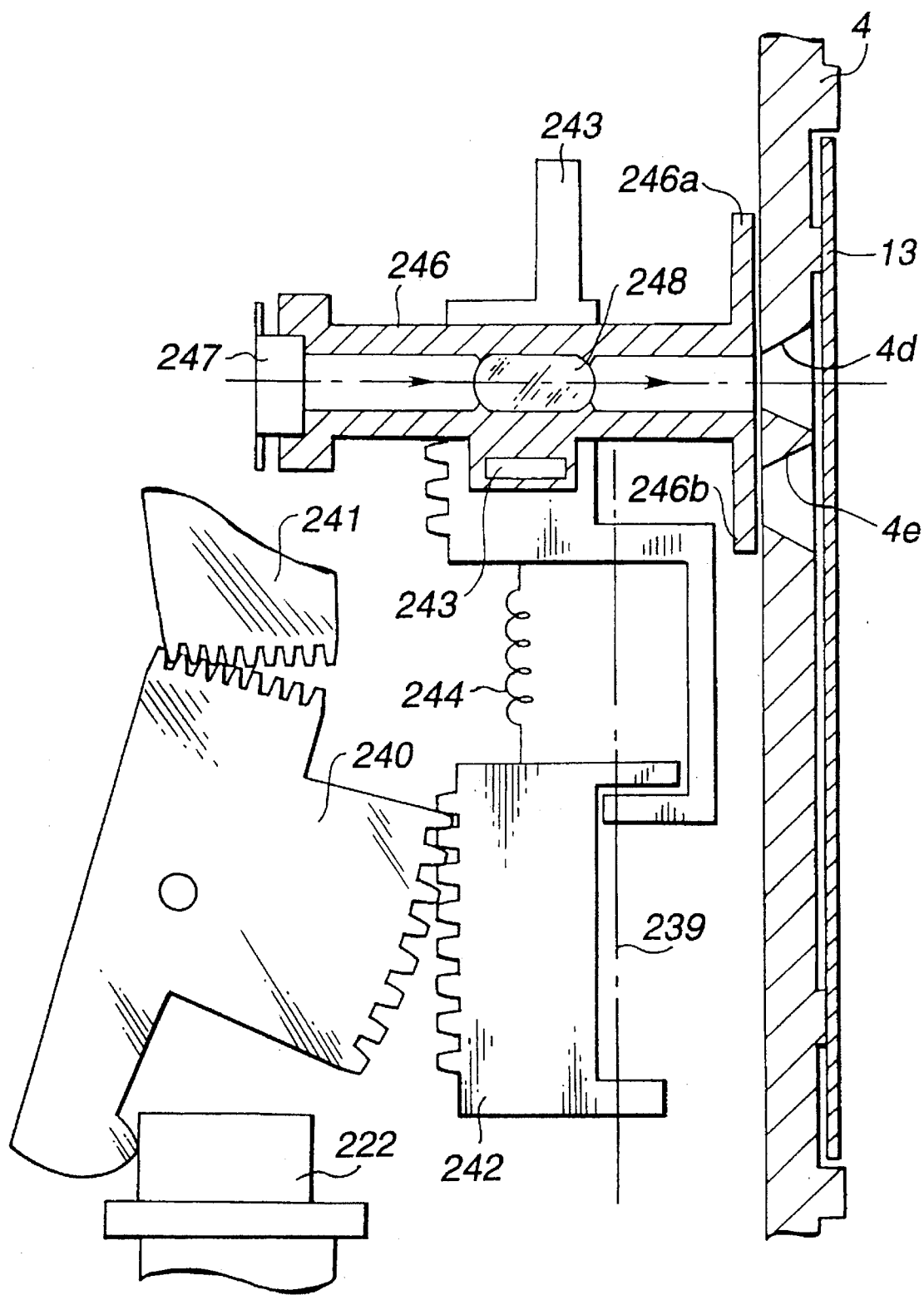
FIG. 16 is a side view illustrating the essential portion of the panorama switching mechanism in a state in which a wide photographic image-plane size is selected when viewed from a direction opposite to that in FIG. 14 in the camera in accordance with the embodiment of the present invention.
Figure 17:
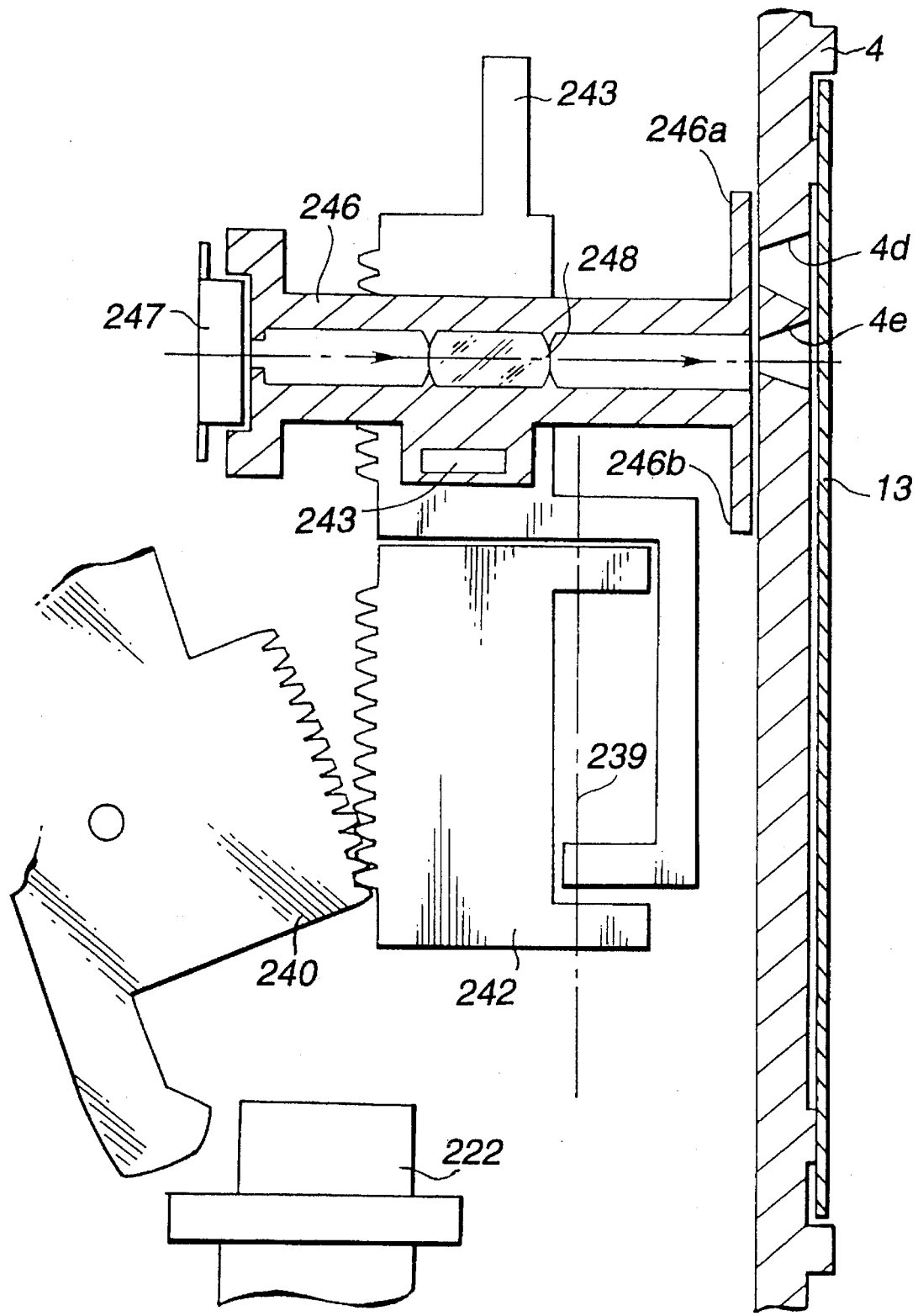
FIG. 17 is a side view illustrating the essential portion of the panorama switching mechanism in a state in which a narrow photographic image-plane size is selected when viewed from a direction opposite to that in FIG. 15 in the camera in accordance with the embodiment of the present invention.

FIG. 7 is a perspective view illustrating the overall panorama switching mechanism. FIGS. 8 to 11 are plan views illustrating the cam gear in the camera in accordance with the embodiment of the present invention. FIG. 12 is a front view illustrating the essential portion of the panorama switching mechanism in a state in which a wide photographic image-plane size is selected in the camera. FIG. 13 is a front view illustrating the essential portion of the panorama switching mechanism in a state in which a narrow photographic image-plane size is selected in the camera. FIG. 14 is a side view illustrating the essential portion of the panorama switching mechanism in a state in which a wide photographic image-plane size is selected in the camera. FIG. 15 is a side view illustrating the essential portion of the panorama switching mechanism in a state in which a narrow photographic image-plane size is selected in the camera. FIG. 16 is a side view illustrating the essential portion of the panorama switching mechanism in a state in which a wide photographic image-plane size is selected when viewed from a direction opposite to that in FIG. 14 in the camera. FIG. 17 is a side view illustrating the essential portion of the panorama switching mechanism in a state in which a narrow photographic image-plane size is selected when viewed from a direction opposite to that in FIG. 15 in the camera.

As shown in FIG. 7, the first panoramic gear 240 is supported by a body plate (not shown) so as to be rockable vertically in the figure at a rocking center 240d. An arm 240a, which serves as a cam follower which is brought into contact with the first cam 222a of the cam gear 222, is formed in the lower portion of the first panoramic gear 240. As a result of the rotation of the cam gear 222, the panoramic gear 240 rocks using the rocking center 240d as the fulcrum. A partial gear 240b is formed in the tip of one arm portion of the panoramic gear 240, and a partial gear 240c is formed in the tip of the other arm portion. The partial gear 240b and the partial gear 240c engage the lower light-shielding mask 242 and a second panoramic gear 241, respectively.

The second panoramic gear 241, as shown in FIG. 7, is supported to a body plate (not shown) so as to be rockable vertically in the figure at the rocking center 241d, and a partial gear 241a is formed in the tip of one arm portion, which partial gear 241a is engaged with the partial gear 240c in the panoramic gear 240 and rock in cooperation with the rotation of the panoramic gear 240. Also, a partial gear 241b is formed in the tip of the other arm portion, which partial gear 241b is engaged with the gear 243b of upper light-shielding mask 243.

The lower light-shielding mask 242 and the upper light-shielding mask 243 are both movably supported vertically in FIG. 7 by a fixed shaft 239 (shown as a dot-dash line) in the base end portion. The fixed shaft 239 is supported by a body plate (not shown). The lower light-shielding mask 242 is movable along the fixed shaft 239, and as a result of the movement, the light-shielding portion 242a advances into or retracts from the photographic aperture opening 4c (FIG. 12) of the main body 4. The lower light-shielding mask 242 is moved in a driven manner with respect to the rocking of the first panoramic gear 240 which engages a gear 242b formed on one side of the base end portion.

The upper light-shielding mask 243 is supported movably along the fixed shaft 239 by the fixed shaft 239 together with the lower light-shielding mask 242. As a result of the movement of the upper light-shielding mask 243, a light-shielding portion 243a advances into or retracts from the photographic aperture opening 4c of the main body 4. The upper light-shielding mask 243 is moved in a driven manner with respect to the rocking of the first panoramic gear 241 which engages a gear 243b formed on one side of the base end portion. A gear portion 243c is protrusively formed on the top surface of the base end portion of the upper light-shielding mask 243 and engages a panoramic switching gear 171 for transmitting a driving force to a finder section.

A panoramic spring 244, which is an elastic member by which the light-shielding mask is elastically connected, is disposed between the base end portions of the lower light-shielding mask 242 and the upper light-shielding mask 243. The panoramic spring 244 normally urges the light-shielding masks 242 and 243 in a direction in which they move closer to each other in this embodiment and generates a contact force toward the cam gear 222 applied by the arm 240a of the first panoramic gear 240.

The image-plane size detection switch 245 is fixed to the body plate (not shown), and a contact piece thereof is in contact with the second cam 222b of the cam gear 222. The rotation of the cam gear 222 allows the image-plane size detection switch 245 (hereinafter abbreviated as the PN detection SW 245) to be turned on/off.

A date holder 246 is fixed to the upper light-shielding mask 243 and supports a date lens 248 and a light emission LED 247 (FIGS. 12 and 16). These elements move as one unit when the upper light-shielding mask 243 is moved. Projections 246a and 264b for shielding light are disposed in the back end portion thereof. A hole 4e of the main body is shielded by the projection 246b when photographing at a wider image-plane size (standard image-plane size) so that the film is prevented from being exposed by undesirable light.

On the other hand, when photographing at a narrower image-plane size (panoramic image-plane size), a hole 4d is shielded by the projection 246a so that the film is also prevented from being exposed by undesirable light.

The light emission LED 247, supported by the date holder 246, is a light emission element for imprinting data on the film. The date lens 248, supported by the date holder 246, is a lens for forming light emitted from the light emission LED 247 into an image on the film.

Further, a film photoreflector 249 (hereinafter abbreviated as the film PR 249), disposed at a position facing the perforations of the film (FIG. 2), reads the movement of the perforations and generates and outputs pulse signals.

The main body 4 has the photographic aperture opening 4c for exposing the film 13, and also has the hole 4d for imprinting date information when the image-plane size is standard and the hole 4e for imprinting date information when the image-plane size is panoramic.

According to this embodiment, each of the following operations: a zooming operation, an operation for winding a film, an operation for rewinding a film, and an operation for switching a photographic image-plane size can be performed by one motor. The operation of this embodiment will be explained below.

The zooming operation will be explained first with reference to FIG. 3.

FIG. 3 is a plan view illustrating the main gear trains when a zooming operation is possible. As shown in FIG. 3, when the planetary gear 203 is engaged with the first zoom gear 209, zooming is possible. When, at this time, electric current is supplied to the body drive motor 201 to make the motor be rotated, the fifth zoom gear 227 is rotated by the first zoom gear 209, so that the rotation frame 51 is rotated and the zoom PI gear 212 is rotated. In this way, the amount of rotation of the rotation frame 51 is detected.

As shown in FIG. 1, a zoom encoder pattern sheet 76 is pasted on the rotation frame 51, and a zoom photoreflector 139 (hereinafter abbreviated as the zoom PR 139) is disposed at a position facing the zoom encoder pattern sheet 76. With this arrangement, the rotational position, which is a reference for the rotation frame 51, is detected so that the amount of rotation is detected more precisely on the basis of the output from the zoom PI 213.

When the body drive motor 201 is rotated in the clockwise direction, extension from the barrel collapsed state to the wide angle state and zooming toward the tele end side are performed. When the body drive motor 201 is rotated in the counterclockwise direction, zooming toward the wide angle side is performed, and the lens frame is collapsed in the final area. The zoom encoder pattern sheet 76 is provided so that the output from the zoom PR 139 varies as described below. That is, the area from the collapsed area to the area before the wide end is at an "L" level, the area from the wide end to the area before the wide end is at an "H" level, and the tele end is at an "L" level.

Next, the film winding operation will be explained with reference to FIG. 4.

FIG. 4 is a plan view illustrating the main gear trains when a film winding operation is possible. As shown in FIG. 4, when the planetary gear 203 is engaged with the sun gear 208, winding is possible. When, at this time, electric current is supplied to the body drive motor 201 to make it rotate in the clockwise direction, the winding planetary gear 215 engages the spool 217, causing the spool 217 to rotate. The amount of film 13 taken up by the spool 217 is detected by the film PR 249 (FIG. 2).

Next, the film rewinding operation will be explained with reference to FIG. 5.

FIG. 5 is a plan view illustrating the main gear trains when a film rewinding operation is possible. As shown in FIG. 5, rewinding is possible when the planetary gear 203 is engaged with the sun gear 208, the panoramic carrier 221 is rotated toward the first rewinding gear 224 as a result of the rotation of the rotation frame 51, and the panoramic planetary gear 220 is engaged with the first rewinding gear 224.

In this embodiment, during barrel collapsing, the cam 51d of the rotation frame 51 makes the projection 223b of the switching lever 223 be rotated so that rewinding is possible. Therefore, when the lens frame is not at the barrel collapsed position, rewinding is not possible. When the body drive motor 201 is rotated in the counterclockwise direction, rewinding is performed.

Since, during rewinding, the rotational force of the switching lever 223 acts counterclockwise by the reaction force which occurs when the panoramic planetary gear 220 engages the first rewinding gear 224, the extreme end portion 51d' of the cam 51d is formed into a surface at right angles to the optical axis so that the rotation frame 51 is not rotated by the rotational force.

Next, the photographic image-plane size switching operation will be explained with reference to FIG. 6.

FIG. 6 is a plan view illustrating the main gear trains when the photographic image-plane size switching operation is possible. As shown in FIG. 6, when the planetary gear 203 is engaged with the sun gear 208 and the switching lever 223 is free with respect to the cam 51d of the rotation frame 51, switching of the image-plane size is possible. Therefore, when the lens frame is collapsed, switching of the image-plane size is not possible.

When an attempt is made to switch the image-plane size while the planetary gear 203 is engaged with the first zoom gear 209, it is necessary to make the planetary gear 203 be engaged with the winding sun gear 208 first. For this purpose, electric current is supplied to the coil 206a first in order to unlock the carrier 204, and then electric current is supplied to the body drive motor 201 in order to make it be rotated clockwise, thereby causing the carrier 204 to rotate.

If the supply of electric current to the body drive motor 201 is continued at this time, the spool is rotated because the direction of rotation of the body drive motor 201 for rotating the carrier is the same as that of the body drive motor 201 for winding the film, and the film is taken up, which is problematical. For example, when zooming and image-plane size switching are performed alternately, the film is taken up little by little though the photographer has not taken even one photograph.

To solve the above problem, control is effected in this embodiment in such a way that when the carrier 204 is rotated toward the sun gear 208, the drive voltage of the body drive motor 201 is lowered so that the carrier 204 is rotated at such a weak force by which the film cannot be rolled up. Also, to make the time of the supply of electric current to the body drive motor 201 as short as possible, the carrier PI 207 is disposed as a photointerruptor for detecting the position of the carrier 204.

Also, it is designed that just before the rotation of the carrier 204 toward the sun gear 208 side is completed, the pulse output from the carrier PI 207 varies. When the pulse output is detected, the supply of electric current to the body drive motor 201 is stopped. Thus, the time of the supply of electric current to the body drive motor 201 can be minimized. By using such a method, the problem of film winding during the switching of the image-plane size is solved in this embodiment.

When the body drive motor 201 rotates in the counterclockwise direction, the panoramic planetary gear 220 engages the cam gear 222, causing the cam gear 222 to rotate. The procedure of switching the image-plane size by causing the cam gear 222 to rotate will be explained below.

The photographic image-plane size switching mechanism is constructed as shown in FIG. 7. As a result of the rotation of the cam gear 222, the first panoramic gear 240 rotates, the lower light-shielding mask 242 and the upper light-shielding mask 243 move in directions parallel to the fixed shaft 239 (not shown), only the center line of which is shown, and they repeatedly advance into or retract from the photographic aperture opening 4c. Thus, the image-plane size is switched. The relationship between the position of the cam gear 222 and the image-plane size will be detected below.

Figure 8:
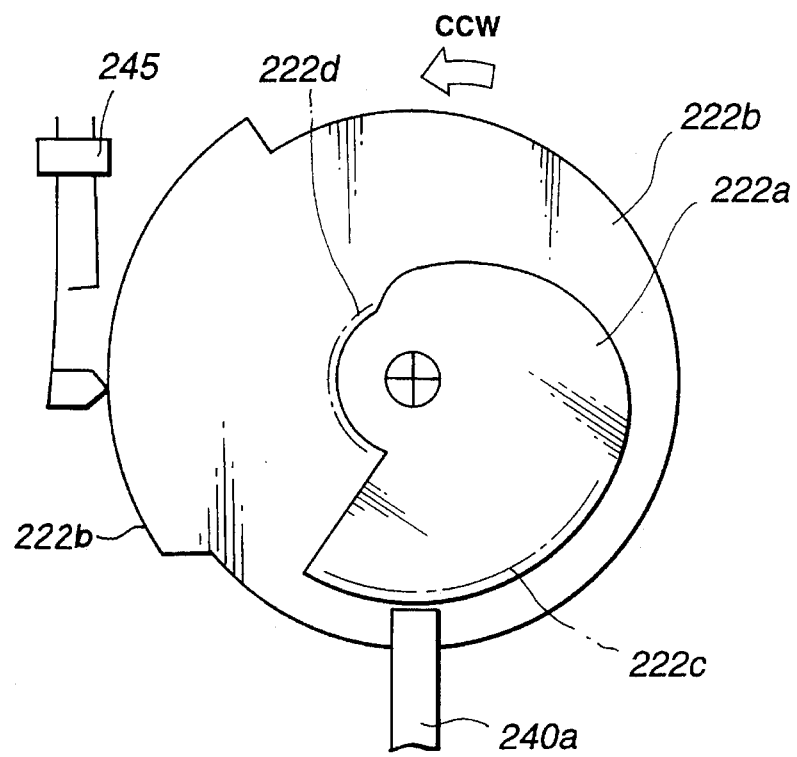
FIG. 8 is a plan view illustrating the positional relationship between a cam gear 222 and an arm 240a of a first panoramic gear 240 when the image plane is of the standard size in the camera in accordance with the embodiment of the present invention.

FIG. 8 is a plan view illustrating the positional relationship between the cam gear 222 and the arm 240a of the first panoramic gear 240 when the image plane is of the standard size in the embodiment of the present invention. The reference numeral 222c identifies a dot-dash line which indicates the range in which the first cam 222a is held by the standard image-plane size, and reference numeral 222d identifies a dot-dash line which indicates the range in which the first cam 222a is held by the panoramic image-plane size.

In the state shown in FIG. 8, both the lower light-shielding mask 242 and the upper light-shielding mask 243 have retracted outside the photographic aperture opening 4c, and the image-plane size is maintained at the standard state. Also, the image-plane size detection switch 245 at this time is held in its off state by the second cam 222b of the cam gear 222. Upon the photographer operating the operation member (not shown) to take a photograph at the panoramic image-plane size, the supply of electric current to the body drive motor 201 is started, and the cam gear 222 starts to rotate.

Figure 9:
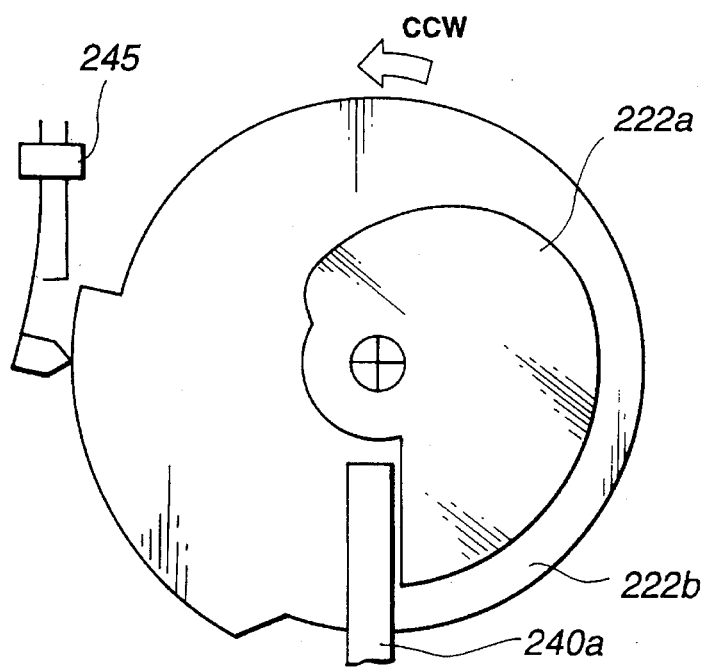
FIG. 9 is a plan view illustrating the state at the moment when the arm 240a of the first panoramic gear 240 is rotated toward the center of the cam gear 222 in the camera in accordance with the embodiment of the present invention.

FIG. 9 is a plan view illustrating the state of the moment when the arm 240a of the first panoramic gear 240 is rotated toward the center of the cam gear 222.

At this time, both the lower light-shielding mask 242 and the upper light-shielding mask 243 have moved to the position of the panoramic image-plane size. However, the image-plane size detection switch 245 is still in its off state.

Figure 10:
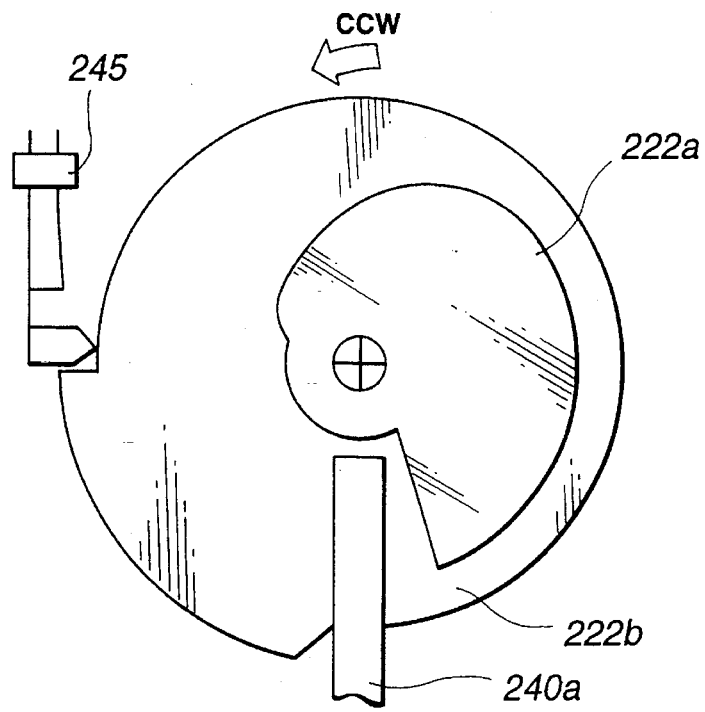
FIG. 10 is a plan view illustrating the state in which the cam gear 222 is rotated slightly from the state shown in FIG. 9 in the camera in accordance with the embodiment of the present invention.

FIG. 10 is a plan view illustrating the state in which the cam gear 222 is rotated slightly from the state shown in FIG. 9.

At this time, the image-plane size detection switch 245 becomes on, the change in the state of the image-plane size detection switch 245 is detected, and the supply of electric current to the body drive motor 201 is stopped, thereby stopping the rotation of the cam gear 222. According to such a procedure, switching to the panoramic image-plane size is performed. Also, the reliability of switching of the light-shielding mask is ensured by providing a time lag between the movement of the light-shielding mask and the change in the state of the image-plane size detection switch 245 in the above-described way.

As a result of the movement of the upper light-shielding mask 243 to the position of the panoramic image-plane size, an eyepiece variable magnification lens frame 167 (FIG. 7) moves, a field of view mask portion 167a and an eyepiece variable magnification lens 157, which are provided integral with the eyepiece variable magnification lens frame 167, advance into the finder optical path, the finder field of view varies in a form similar to or nearly similar to the narrow panoramic image-plane size, and the observation magnification varies. Thus, it is possible to make the photographer recognize that the photographic mode has changed.

A description will be given of the dimensional accuracy of the image-plane size in the above-described operation. The image-plane size along the fixed shaft 239 is obtained by the contact between the lower light-shielding mask 242 and the upper light-shielding mask 243. For this reason, errors due to variations in the outside shape of other parts do not exert an influence, and thus an accurate image-plane size can be obtained. Therefore, at this time, the first cam 222a of the cam gear 222 and the arm 240a of the first panoramic gear 240 are not in contact with each other.

As regards the shift of the image plane with respect to the image-plane center in the above-described operation, if the mechanism of this embodiment is used, the first panoramic gear 240 and the second panoramic gear 241 move symmetrically with respect to the image-plane center the same as if they were reflected by the mirror. Thus, if the light-shielding portions 242a and 243a of the respective lower light-shielding mask 242 and upper light-shielding mask 243 are disposed symmetrically with respect to the image-plane center, these light-shielding portions move symmetrically with respect to the image-plane center the same as if they were reflected in the mirror. Therefore, it is possible to obtain the image-plane center with a high degree of accuracy without particularly using the construction for obtaining the center position accuracy.

When the photographer operates the unillustrated operation member in order to switch to the standard image-plane size, the supply of electric current to the body drive motor 201 is started, and the cam gear 222 starts to rotate.

Figure 11:
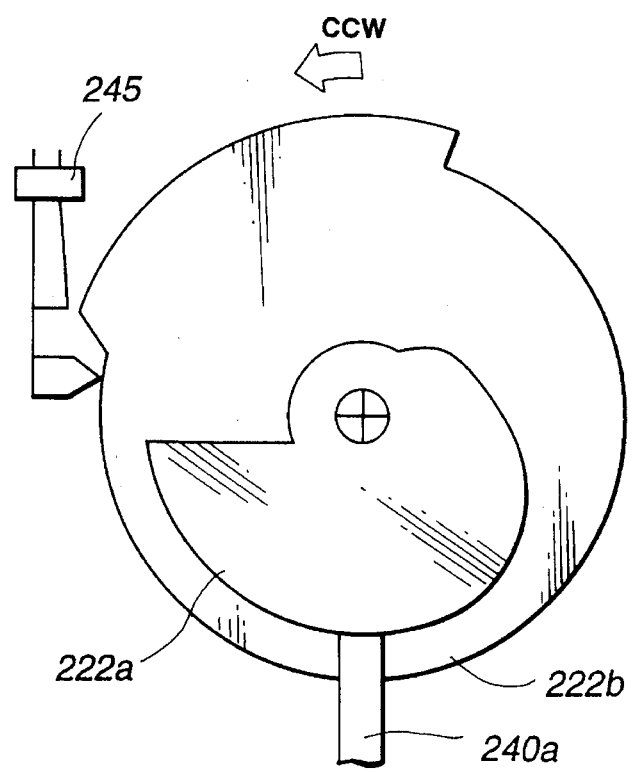
FIG. 11 is a plan view illustrating the state in which the arm 240a of the first panoramic gear 240 is rotated away from the center of the cam gear 222 by a first cam 222a of the cam gear 222 in the camera in accordance with the embodiment of the present invention.

FIG. 11 is a plan view illustrating the state in which the arm 240a of the first panoramic gear 240 is rotated away from the center of the cam gear 222 by the first cam 222a of the cam gear 222.

At this time, the lower light-shielding mask 242 and the upper light-shielding mask 243 have moved to the standard image-plane size position, and the image-plane size detection switch 245 is still on. When the cam gear 222 rotates a little from this state, the image-plane size detection switch 245 is changed to the off state with each of the masks being still at the standard image-plane size position. This change of state is detected, the supply of electric current to the body drive motor 201 is stopped, and the rotation of the cam gear 222 is stopped. As a result, the camera returns to the state shown in FIG. 8.

The switching to the standard image-plane size is performed by the procedure described above. Also, by providing a timing lag between the movement of the light-shielding mask and the change in the state of the image-plane size detection switch 245 in the above-described way, the reliability of the switching of the light-shielding mask is improved.

As a result of the movement of the upper light-shielding mask 243 to the standard image-plane size, the eyepiece variable magnification lens frame 167 moves, and the field of view mask portion 167a and the eyepiece variable magnification lens 157 which have advanced into the finder optical path retracts from the optical path. Thus, it is possible to make the photographer recognize that the photographic mode has changed.

Next, a description will be given of the data imprinting apparatus. In this embodiment, for imprinting data, a method of imprinting data during the feeding of the film is employed.

The light emission LED 247 makes it possible to make data of one character light up by one light emission, and a plurality of light emissions are made to form data of a character string during the feeding of the film. The light emitted from the light emission LED 247 passes through the date lens 248 and is formed into an image on the film, thereby imprinting data. The light emission LED 247 and the date lens 248 are supported by the date holder 246 which is fixed to the upper light-shielding mask 243. For this reason, as a result of the movement of the upper light-shielding mask 243, the date holder 246 also moves. Therefore, the position at which data is imprinted varies due to the switching of the image-plane size, and data is printed on the completed photograph also at the panoramic image-plane size.

FIGS. 18 to 21 are illustrations of the film feeding amount detecting means in this embodiment.

A cartridge compartment 4a and a spool compartment 4b are formed at opposite ends of the main body 4, and an exposure opening portion (aperture) 4c is formed between the cartridge compartment 4a and the spool compartment 4b. Also, holes 4d and 4e for imprinting data are formed in the main body 4 so that data is imprinted on the film through these holes.

A lens unit 2 supports a taking lens 140 and is fixed to the main body 4. The taking lens 140 is a photographic lens for forming an object into an image on the film 13 and is disposed inside the lens unit 2. The spool 217 is rotatably disposed in the center of the spool compartment 4b of the main body 4 so that the film 13 is taken up by the spool. A cartridge 12 is housed in the cartridge compartment 4a of the main body 4, into which cartridge the film 13 is rolled up. In this embodiment, a roll of 35 mm film is used as the film 13.

Figure 20:
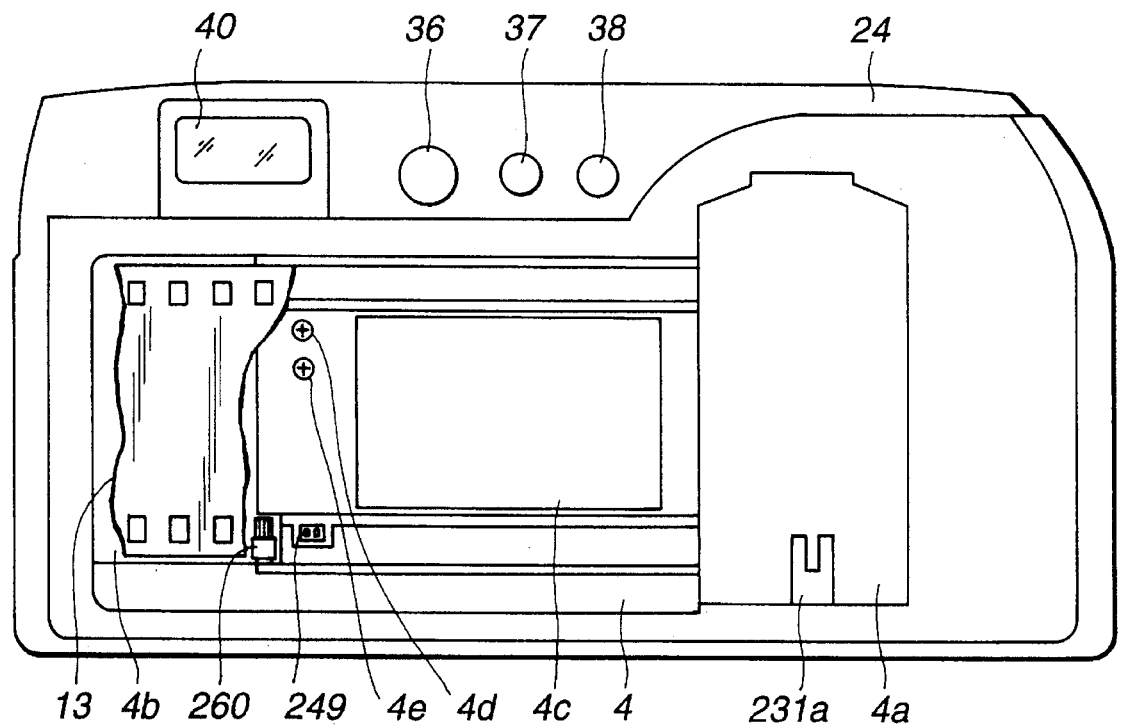
FIG. 20 is a rear view illustrating a state in which a rear lid is opened in the camera in accordance with the embodiment of the present invention.
Figure 21:
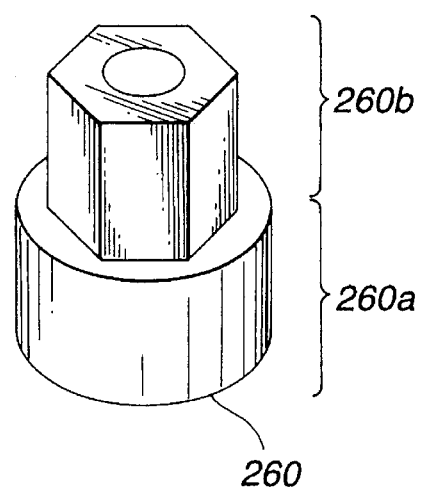
FIG. 21 is an enlarged perspective view of the roller 260 in the camera in accordance with the embodiment of the present invention.

A roller 260, as shown in FIGS. 20 and 21, is formed of a cylindrical portion 260a in contact with the film 13 and a polygonal pillar portion 260b formed of reflecting surfaces, each of which is uniform. This reflecting surface may be a resin member or a member having metallic plating coated on a resin member. Also, a shaft (not shown) passes through the center of the roller 260 so that the roller 260 is rotatably supported. The unillustrated shaft is fixed to the main body 4, and the roller 260 is rotated in a driven manner in response to the movement of the film 13.

A data imprinting timing photoreflector 261 (hereinafter abbreviated as a data PR 261) is disposed at a position facing the polygonal pillar portion 260b formed of reflecting surfaces of the roller 260. When the reflecting surface of the polygonal pillar portion 260b and the data PR 261 face parallelly with each other as a result of the rotation of the roller 260, the light emitted from the data PR 261 is reflected by the reflecting surface and returns to the data PR 261 again. Because of this, output pulses are generated from the data PR 261.

A plate spring 262 is fixed to a back lid 25 and is elastically brought into contact with the cylindrical portion 260a of the roller 260. A pressure plate 263 is mounted in the back lid 25 via a pressure plate spring 264 so that the film 13 is prevented from floating and the flatness of the film 13 is increased. The pressure plate spring 264 is mounted in the back lid 25 by an urging means for elastically urging the pressure plate 263 toward the main body 4.

The light emission LED 248 is a light emission element having seven segments for imprinting data, which LED is supported by the date holder 246. Data for one character can be expressed by one light emission. The date LED 247 is a lens for forming a character caused by the light emission by the light emission LED 248 into an image on the film 13 and is also supported by the date holder 246.

The date holder 246, as described above, supports the light emission LED 248 and the date lens 247, and is fixed to the lower light-shielding mask 242. The date holder 246 moves vertically to a position at which the center of the holes 4d or 4e of the main body 4 is aligned coaxially with the center of the light emission LED 248 and the date lens 247.

Figure 18:
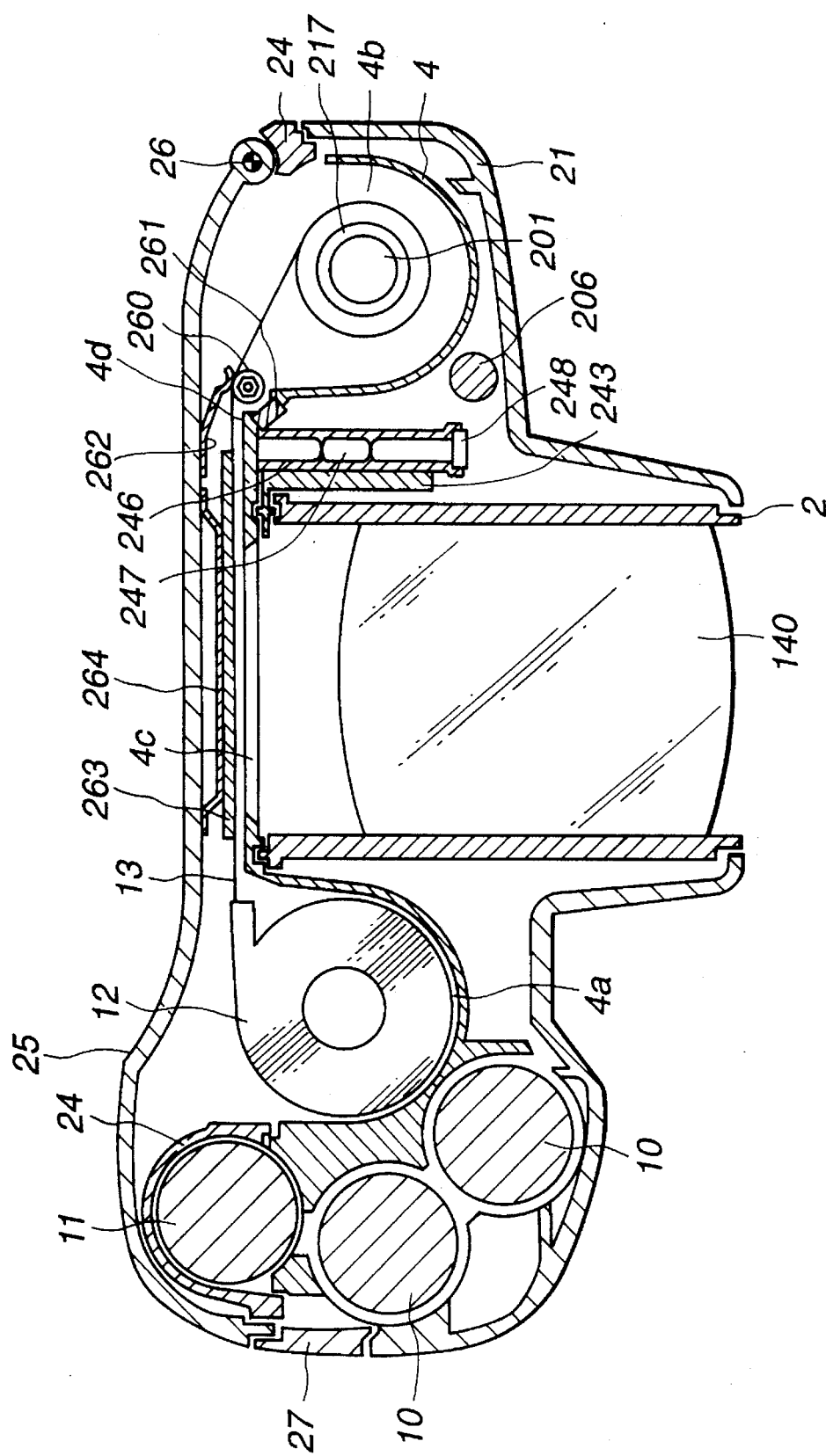
FIG. 18 is a sectional view illustrating the essential portion of the camera in accordance with the embodiment of the present invention.

In FIG. 18, reference numeral 11 denotes a main capacitor for strobe, and reference numerals 10 denote two power-supply batteries. The film PR 249 is disposed at a position facing the perforations of the film 13. The film PR 249 counts the number of perforations which are passed on the basis of the output pulse signal from the film PR 249 and feeds one frame of film. Reference numeral 21 denotes a front cover which is an external portion of the camera; and reference numeral 24 denotes a back cover which rotatably supports the back lid 25.

The back lid 25 is formed with a hinge portion at its one end and is supported to the back cover 24 with the hinge portion being the rotational center so that the back lid 25 can be opened/closed. The plate spring 262 and the pressure plate spring 264 are mounted in the back lid 25. A back lid shaft 26 is a shaft for rotatably supporting the back lid 25 and the back cover 24. Reference numeral 27 denotes a side cover which is an external portion of the camera; reference numerals 36, 37 and 38 each denote operation buttons; and reference numeral 40 denotes a finder window.

Next, the operation of the roller 260 will be explained.

As shown in FIG. 18, the rotation of the body drive motor 201 causes the spool 217 to rotate, and the roller 260 is rotated in a driven manner by the film 13 when the film 13 is taken up. To improve the follow-up to the movement of the roller 260 and the film 13 while the roller 260 is rotating, it is necessary to increase the pressure contact force between the roller 260 and the film 13 to a certain extent. For this purpose, as described above, the plate spring 262 which elastically comes into pressure contact with the roller 260 is mounted in the back lid 25.

Since the plate spring 262 is mounted in the back lid 25, if the back lid 25 is opened, the pressure contact between the roller 260 and the plate spring 262 is released. At this time, if the cartridge 12 is loaded and the back lid 25 is opened with the leader of the film 13 being in line with an automatic load indicating mark (not shown), the film 13 is fastened between the roller 260 and the plate spring 262 and is brought into contact with the roller 260 by the elastic force of the plate spring 262.

The position at which the roller 260 is disposed along the feeding direction of the film is in the vicinity of the entrance of the spool compartment 4b of the main body 4, and it is disposed at a position at which the direction of the film is changed from a direction nearly parallel to the aperture opening 4c toward the spool 217. Thus, it is possible to increase the force by which the film 13 contacts the roller 260.

In this embodiment, the follow-up characteristic of the roller 260 with respect to the film 13 is improved in the above-described way.

Next, a description will be given of the position at which the roller 260 is disposed along the direction at right angles to the feeding direction of the film.

In this embodiment, a consideration is given to the position at which the film contact portion 260a of the roller 260 is disposed. That is, if the film contact portion 260a is disposed at a position in contact with the photographic image-plane portion of the film 13, the film might be damaged. Also, if the film contact portion 260a is disposed so as to come into contact with the perforations, the follow-up of the roller 260 with respect to the movement of the film 13 becomes poor. Therefore, in this embodiment, the film contact portion 260a of the roller 260 is disposed at a position in contact with the outer edge portion of the perforations of the film 13. FIG. 20 illustrates an example in which the roller 260 is disposed at an appropriate position.

As a result of the rotation of the roller 260, pulse signals are generated by the data PR 261, and it is possible to calculate the amount of film fed by counting the number of pulses. If the diameter of the roller 260 is set so that when 10 rotations of the roller 260 corresponds to the amount of take-up of one frame of film, and if the polygonal pillar portion 260b is a regular hexagonal pillar, the number of output pulses per one frame is 10 (rotations)×6 (pillar)=60 (pulses).

On the other hand, in a film feeding detection method of directly reading the perforations of the film 13 by a known photoreflector, 8 pulses are output because one frame of film corresponds to eight perforations. Therefore, use of a roller makes it possible to more precisely detect the amount of film fed.

A photograph having a date or the like imprinted within the print of the photograph has recently come to be pervasive. With a camera equipped with such a film feeding detection apparatus as in this embodiment, such data imprinting apparatus can be realized by a simple construction.

Figure 19:
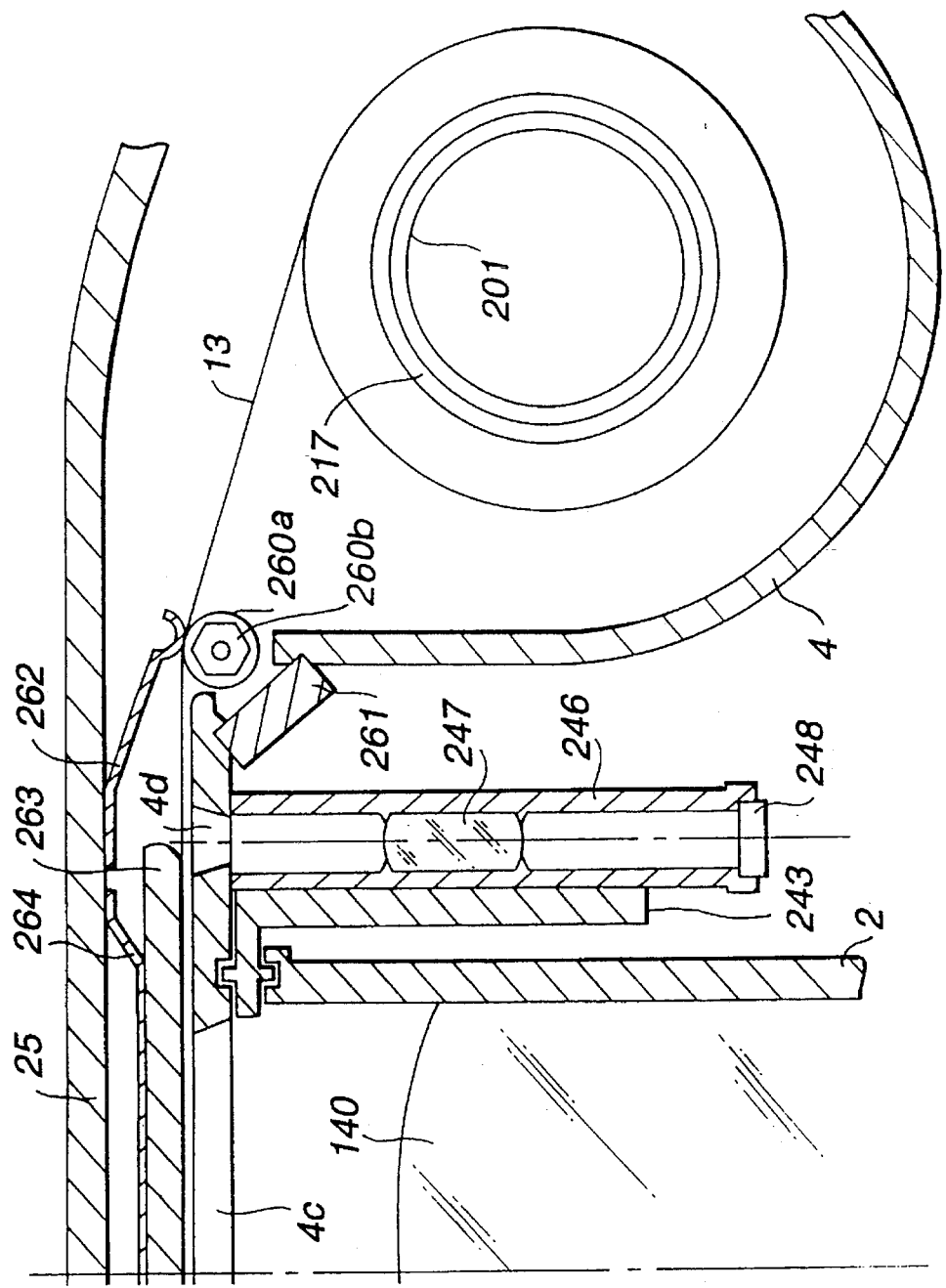
FIG. 19 is a sectional view in which the essential portion near a roller 260 is enlarged in the camera in accordance with the embodiment of the present invention.

In the data imprinting apparatus, data is imprinted while the film is being fed. As shown in FIGS. 18 and 19, the light emitting LED 248 and the date lens 247 are supported by the date holder 246 which is positioned with respect to the main body 4. The hole 4d for imprinting data is provided in the main body 4, and as a result of the light emitted from the light emission LED 248 passing through the date lens 247, an image is formed on the film 13 so that data is imprinted.

The light emission LED 248 is capable of exposing data for one character per one light emission. Therefore, when data is to be imprinted, the light emission LED 248 is made to emit light for a required number of times when the film 13 is fed and passed on the hole 4d of the main body 4 so that data is imprinted.

The feeding speed of the film 13 is not necessarily constant due to variations in the amount of a pull-out force from the cartridge 12, and due to variations in the mechanical accuracy and wear of the winding gear trains (not shown) and winding motor, and the feeding speed of the film 13 varies by a small amount at all times. Because of this, if the light emission LED 248 is always made to emit light at a lapse of a fixed time without detecting the feeding speed of the film 13 in order to imprint data, the character spacing of the character string to be imprinted on the film 13 becomes wider or narrower and the characters overlap each other. Therefore, the feeding speed must be detected with a high degree of accuracy.

In this embodiment, the feeding speed is detected by measuring the intervals at which the output pulse signals are generated from the data PR 261. In the known film feeding detection method in which perforations are directly read, the resolution per one frame is 8 because 8 pulses are output per one frame. On the other hand, if the above-described roller is used, an output signal of 60 pulses is generated per one frame, the resolution per one frame becomes 60. Thus, the feeding detection apparatus employing a roller is capable of more precisely detecting the feeding speed, and light emission interval control such that the character spacing during data imprinting can be aligned correctly is possible.

The polygonal pillar portion 260b of the roller 260 need not to be a hexagon as in the roller shown as an example, and any polygonal pillar may be used by taking character spacing during data imprinting into consideration. A cylinder may be used in which the reflecting surfaces and the non-reflecting surfaces are painted alternately in silver and black. Since a data imprinting function is used in this embodiment, a high resolution is necessary, and thus the polygonal pillar portion 260b is formed into a polygon having a great number of sides.

The difference between character spacings due to the high or low resolution will be explained with reference to FIGS. 22A, 22B, 22C, 23A, 23B and 23C.

Figures 22A, 22B, 22C:
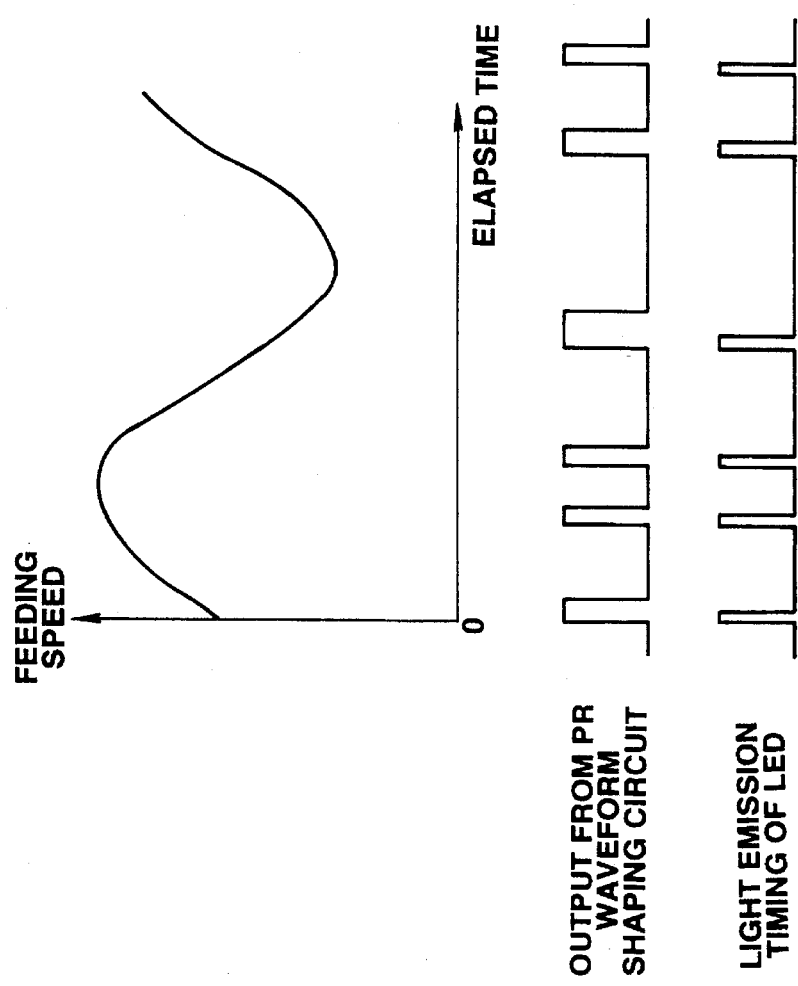
FIG. 22A is a chart illustrating the degree of variation in the film feeding speed when the detection resolution is high in the camera in accordance with the embodiment of the present invention.
FIG. 22B is a timing chart illustrating an output from a PR waveform shaping circuit with respect to the degree of variation in the film feeding speed when the detection resolution is high, and a light emission timing of a light emission diode in the camera in accordance with the embodiment of the present invention.
FIG. 22C is a chart illustrating an example of imprinting characters for imprinting data when the detection resolution is high in the camera in accordance with the embodiment of the present invention.

FIGS. 22A, 22B and 22C are illustrations in which one character is imprinted each time there is one pulse signal output from the data PR 261 when the resolution is high. FIG. 22A is a chart illustrating the degree of variation in the film feeding speed. FIG. 22B is a timing chart illustrating an output from a PR waveform shaping circuit with respect to the degree of variation in the film feeding speed, and a light emission timing of a light emission diode. FIG. 22C is a chart illustrating an example of imprinting data.

Figures 23A, 23B, 23C:
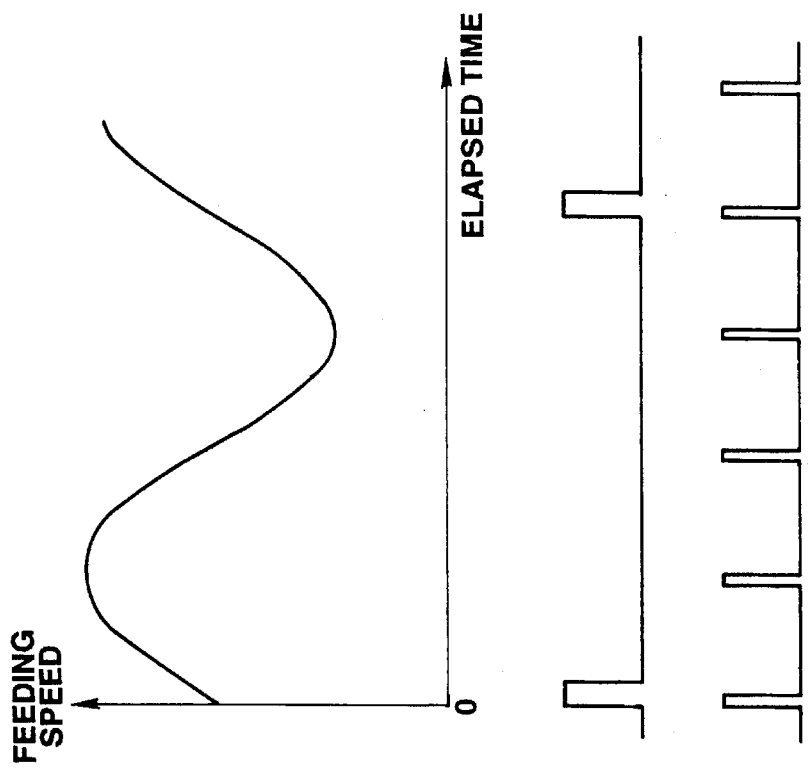
FIG. 23A is a chart illustrating the degree of variation in the film feeding speed when the detection resolution is high in the camera in accordance with the embodiment of the present invention.
FIG. 23B is a timing chart illustrating an output from a PR waveform shaping circuit with respect to the degree of variation in the film feeding speed when the detection resolution is high, and a light emission timing of a light emission diode in the camera in accordance with the embodiment of the present invention.
FIG. 23C is a chart illustrating an example of imprinting characters for imprinting data when the detection resolution is high in the camera in accordance with the embodiment of the present invention.

FIGS. 23A, 23B and 23C are illustrations in which four characters are imprinted each time there is one pulse signal output from the data PR 261. FIG. 23B is a timing chart illustrating an output from a PR waveform shaping circuit with respect to the degree of variation in the film feeding speed, and a light emission timing of a light emission diode. FIG. 23C is a chart illustrating an example of imprinting data.

In the illustrations shown in FIGS. 22A to 22C, when one pulse signal is generated from the data PR 261, data is imprinted for one character. Even if the film feeding speed varies, the interval at which the pulse signal output from the data PR 261 varies in response to that variation. Thus, the character spacing of a data imprinting character string becomes constant.

In the illustrations shown in FIGS. 23A to 23C, since a variation in the feeding speed between two output pulse signals from the data PR 261 need not to be detected, the control means controls assuming that the feeding speed is constant. As a result, the character spacing of the character string is varied. The smaller the number of characters imprinted each time one pulse signal is output from the data PR 261, the smaller the variation in the character spacing can be made, and the greater the number of characters imprinted, the greater the variation in the character spacing becomes.

Since the film PR 249 for detecting the movement of the perforations is used to detect the feeding of one frame of film in this embodiment, no accumulative error in the film feeding amount, which increases as the number of photographs taken increases, occurs. Since a method of reading the rotation of the roller 260 at a high resolution is used to imprint data, it is possible to realize a camera in which the character spacing of data is stable.

Next, a description will be given of a modification of a film feeding amount detection mechanism in the above-described embodiment.

Figure 35:
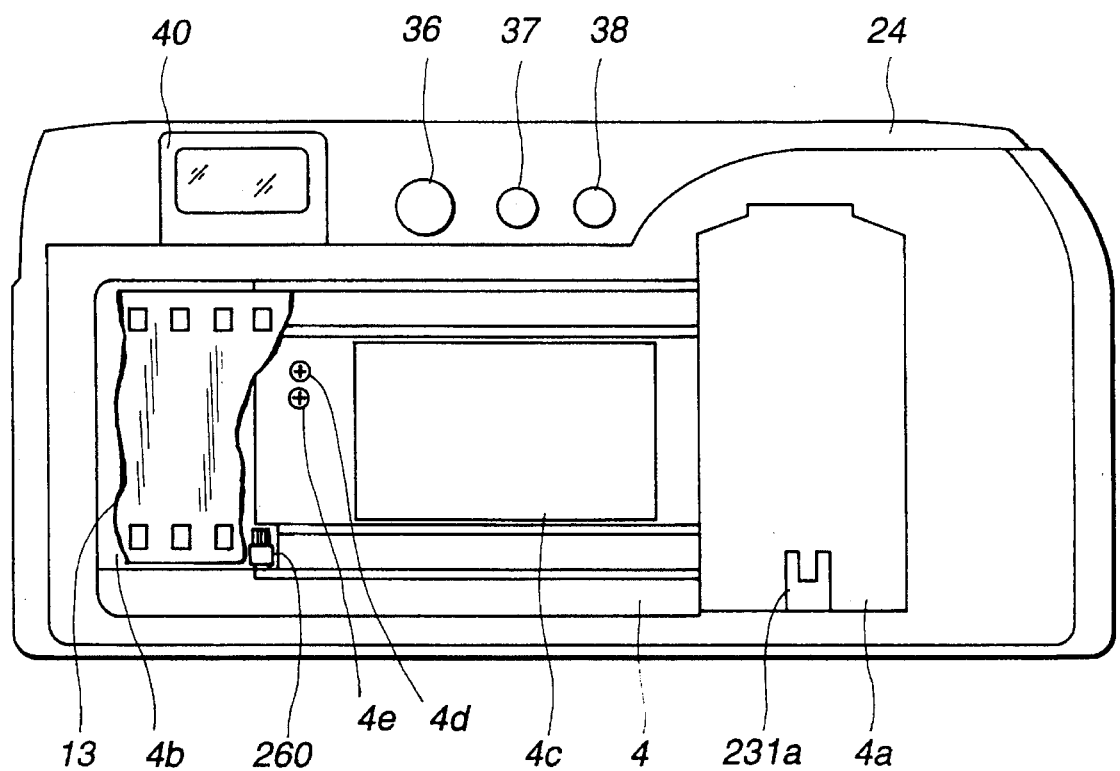
FIG. 35 is a rear view illustrating a modification of the film feeding amount detection mechanism in the camera in accordance with the embodiment of the present invention.

Since almost no error in the feeding of one frame of film occurs if the diameter of the roller 260 is manufactured with a high degree of accuracy, it does not matter if feeding of one frame of film is performed only by the data PR 261 for detecting the rotation of the roller 260. In this case, since the film PR 249 need not to be used, it is possible to realize a more compact camera having fewer parts (see FIG. 35). In addition, in the case of a camera having no data imprinting function, the resolution may be low. Therefore, the polygonal pillar portion 260b may be a polygon having a small number of sides.

Figure 24:
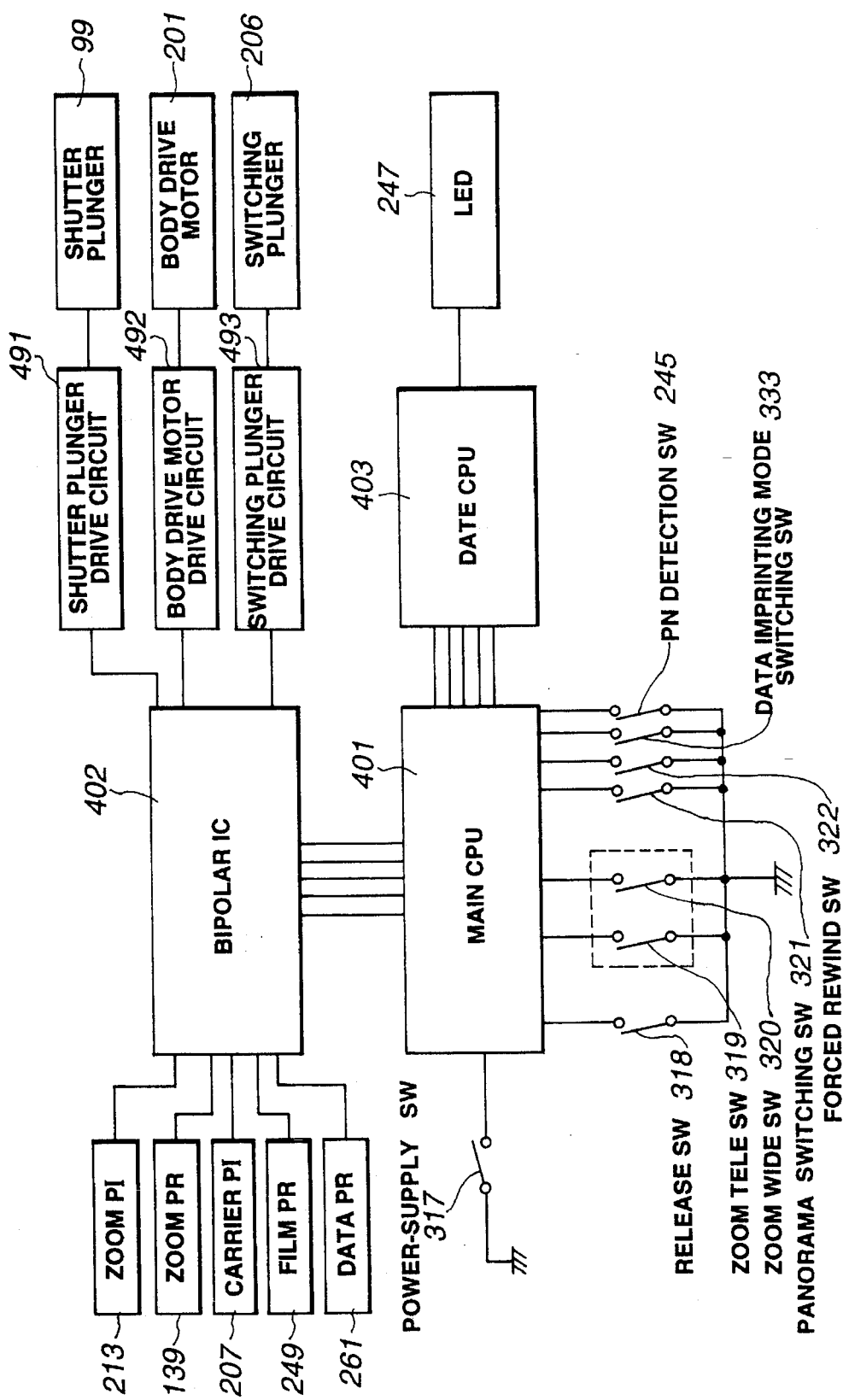
FIG. 24 is a block diagram illustrating the construction of an electric circuit in the camera in accordance with the embodiment of the present invention.

FIG. 24 is a block diagram illustrating the construction of an electric circuit in the camera in accordance with the embodiment.

A bipolar IC 402 inputs pulse signals from the zoom PI 213, the zoom PR 139, the carrier PI 207, the film PR 249 and the data PR 261, shapes each of the waveform and outputs it to a main CPU 401. Further, a shutter plunger 99, the body drive motor 201, and the switching plunger 206 are driven by a shutter plunger drive circuit 491, a body drive motor drive circuit 492, and a switching plunger drive circuit 493 on the basis of each actuator drive signal from the main CPU 401.

Being a CPU for controlling the driving of the entire camera, the main CPU 401 detects the status of a release switch (SW) 318, a zoom tele switch (SW) 319, a zoom wide switch (SW) 320, a panoramic switching switch (SW) 321, a forced rewinding switch (SW) 322, a data imprinting mode switching switch (SW) 333, and an image-plane size detection switch (SW) 245. Also, the main CPU 401 outputs an operation signal to the bipolar IC 402, a date CPU 403 and the like on the basis of each of the above input signals. In addition, the main CPU 401 detects the status of a power-supply switch (SW) 317 and controls the on/off of the power supply of the entire camera.

The date CPU 403 always calculates the data of year, month, hour and minute, makes the light emission LED 248 emit light on the basis of imprinting signals from the main CPU 401 so that data is imprinted on the film 13.

The shutter plunger 99 is driven by the shutter plunger drive circuit 491. When a voltage is applied to make electric current flow through the shutter plunger 99, the shutter is opened, and when the electric current is turned off, the shutter is closed.

Next, each operation of this embodiment will be explained with reference to the flowcharts shown in FIGS. 25 to 34.

Figure 25:
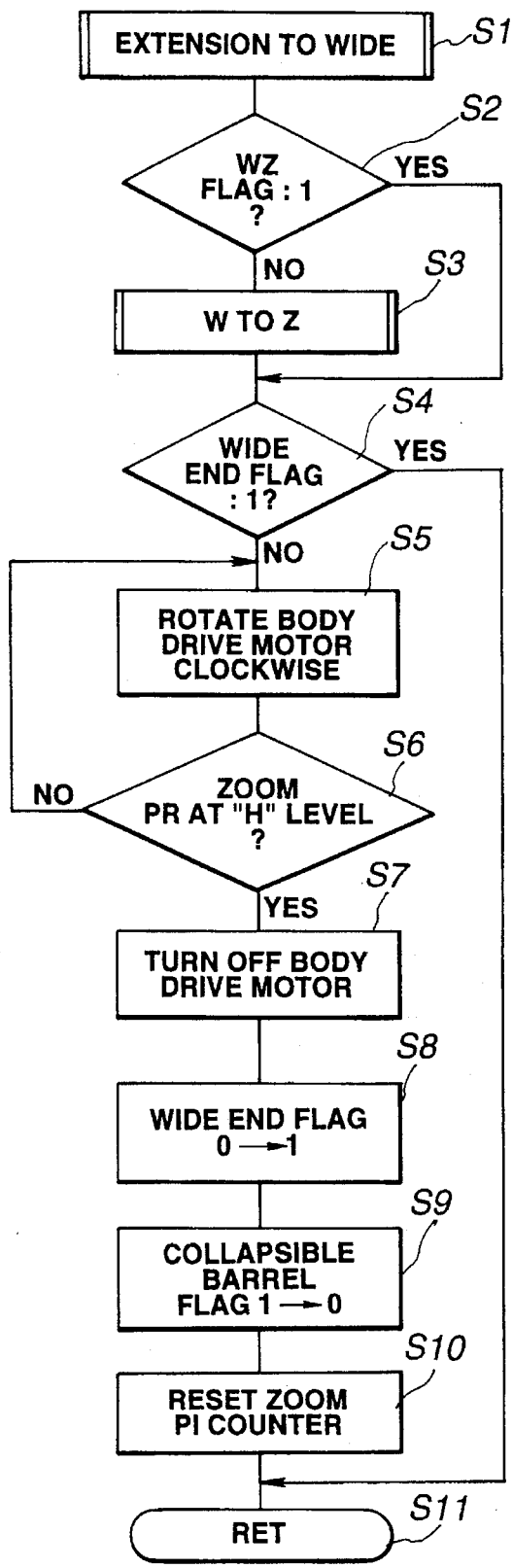
FIG. 25 is a flowchart illustrating an operation for extending a lens frame from its collapsed state to a wide end in the camera in accordance with the embodiment of the present invention.

FIG. 25 is a flowchart illustrating an operation for extending a lens frame from its collapsed state to a wide end.

When the power-supply SW 317 is changed from off to on, an operation for extending to a wide end is started (step S1). First, a check is made to determine if the planetary gear 203 is connected to the lens frame drive side, that is, whether the WZ flag is 1 (step S2). When the planetary gear 203 is not connected to the lens frame drive side, a subroutine (W to Z) for switching the carrier 204 to the lens frame drive side is performed (step S3).

Thereafter, a check is made to determine if the wide end flag is 1 (step S4). If the flag is 1, the process returns to the main routine (step S11). If the wide end flag is not 1, the body drive motor 201 is rotated in the clockwise direction until the zoom PR 139 reaches an "H" level (steps S5 and S6), and the lens frame is extended to the wide end.

Thereafter, after the body drive motor 201 is turned off (step S7), the wide end flag is changed from 0 to 1 (step S8), and then the barrel collapsing flag is changed from 1 to 0 (step S9). Then, the counter of the zoom PI 213 is reset (step S10), and the process returns to the main routine (step S11).

Figure 26:
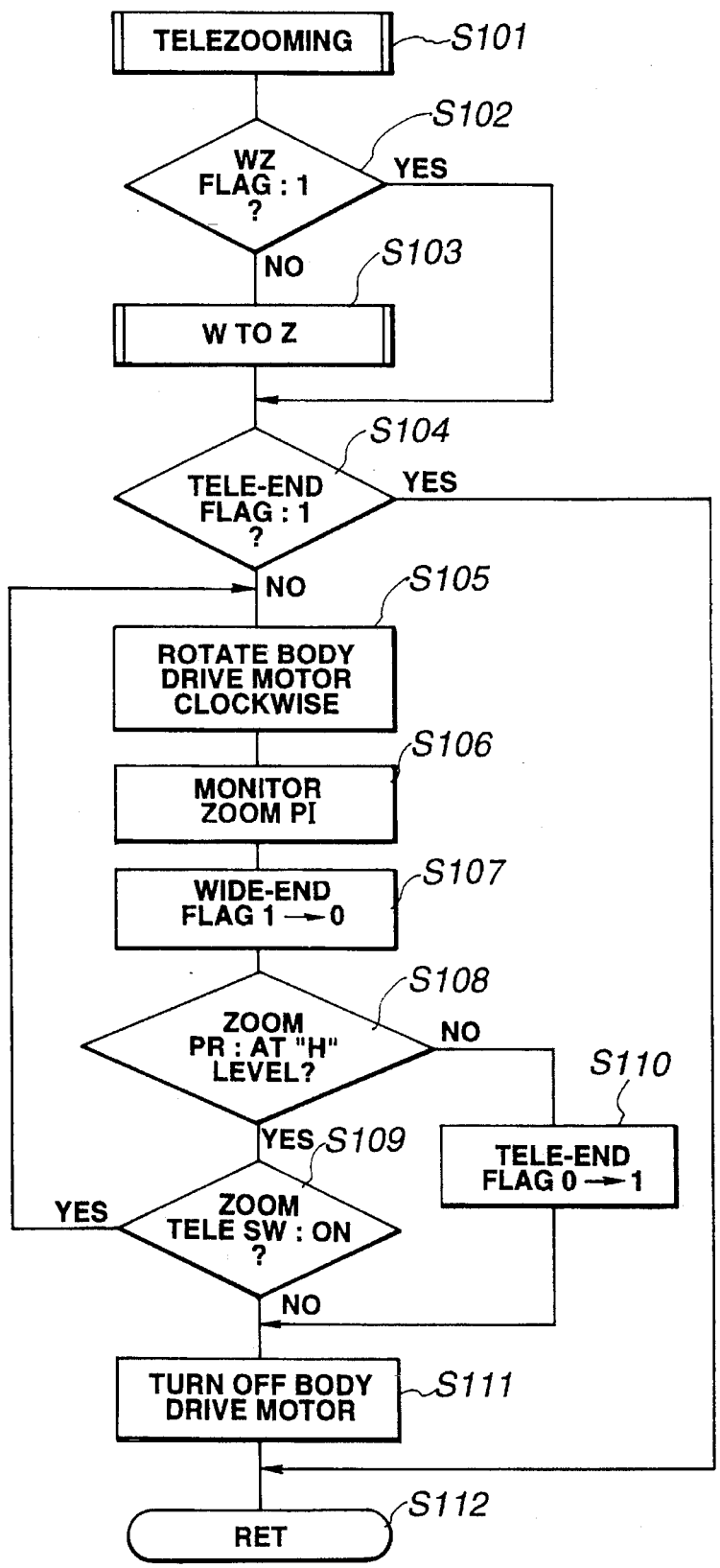
FIG. 26 is a flowchart illustrating an operation for zooming toward a tele side in the camera in accordance with the embodiment of the present invention.

FIG. 26 is a flowchart illustrating an operation for zooming toward a tele side.

Upon the zoom tele switch (SW) 319 becoming on, the tele zooming operation is started (step S101). In the zooming operation, zooming toward the tele end side is performed after the gear trains are properly switched to the lens frame drive side in the same manner as in the extension operation shown in FIG. 25. When the tele end state is reached, then the zooming is terminated. The details will be explained below.

Initially, a check is made to determine if the planetary gear 203 is connected to the lens frame drive side, that is, if the WZ flag is 1 (step S102). When the planetary gear 203 is not connected to the lens frame drive side, the subroutine (W to Z) for switching the carrier 204 to the lens frame drive side is performed (step S103).

Thereafter, a check is made to determine if the tele end flag is 1 (step S104). If the flag is 1, the process returns to main routine (step S112). If the flag is not 1, the body drive motor 201 is rotated in the clockwise direction (step S105), the zoom PI 213 is monitored (step S106), the wide end flag is changed from 1 to 0 (step S107), and a check is made to determine if the zoom PR 139 is at a "H" level (step S108). If the zoom PR 139 is at a "H" level and the zoom tele switch (SW) 319 is on (step S109), the process returns to step S105, and the body drive motor 201 is rotated.

When the zoom tele switch (SW) 319 is off in the above step S109, or when the zoom PR 139 is not at a "H" level in the above step S108, the tele end flag is changed from 0 to 1 (step S110), the body drive motor 201 is turned off (step S111), and the process returns to the main routine (step S112).

Figure 27:
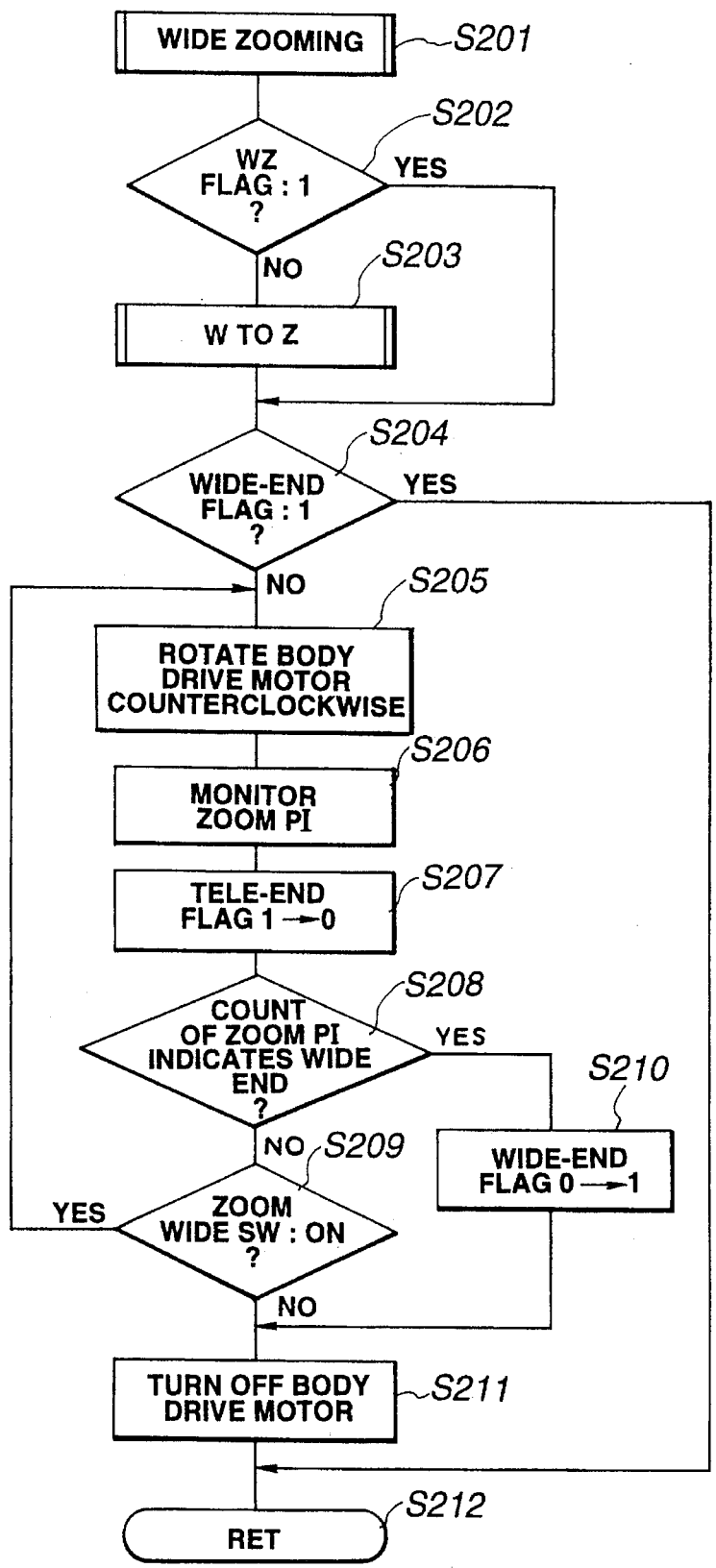
FIG. 27 is a flowchart illustrating an operation for zooming toward a wide side in the camera in accordance with the embodiment of the present invention.

FIG. 27 is a flowchart illustrating an operation for zooming toward a wide side.

When the zoom wide switch (SW) 320 is on, the wide zooming operation is started (step S201). In the zooming operation, zooming toward the wide side is performed after the gear trains are properly switched to the lens frame drive side in the same manner as in the extension operation shown in FIG. 25, and the output of the zoom PI is monitored. When the wide end state is reached, then the zooming is terminated. The details will be explained below.

Initially, a check is made to determine if the planetary gear 203 is connected to the lens frame drive side, that is, if the WZ flag is 1 (step S202). If the planetary gear 203 is not connected to the lens frame drive side, the subroutine (W to Z) for switching the carrier 204 to the lens frame drive side is performed (step S203).

Thereafter, a check is made to determine if the wide end flag is 1 (step S204). If the flag is 1, the process returns to the main routine (step S212). If the flag is not 1, the body drive motor 201 is rotated in the counterclockwise direction (step S205), the zoom PI 213 is monitored (step S206), the tele end flag is changed from 1 to 0 (step S207), and a check is made to determine if the wide end is reached on the basis of the count of the zoom PI 213 (step S208).

When the wide end is not reached, and when the zoom wide switch (SW) 320 is on (step S209), the process returns to step S205 where the body drive motor 201 is rotated.

When the zoom wide switch (SW) 320 is off in the above step S209, or when the wide end is reached on the basis of the count of the zoom PI 213 in the above step S208, the wide end flag is changed from 0 to 1 (step S210), the body drive motor 201 is turned off (step S211), and the process returns to the main routine (step S212).

Figure 28:
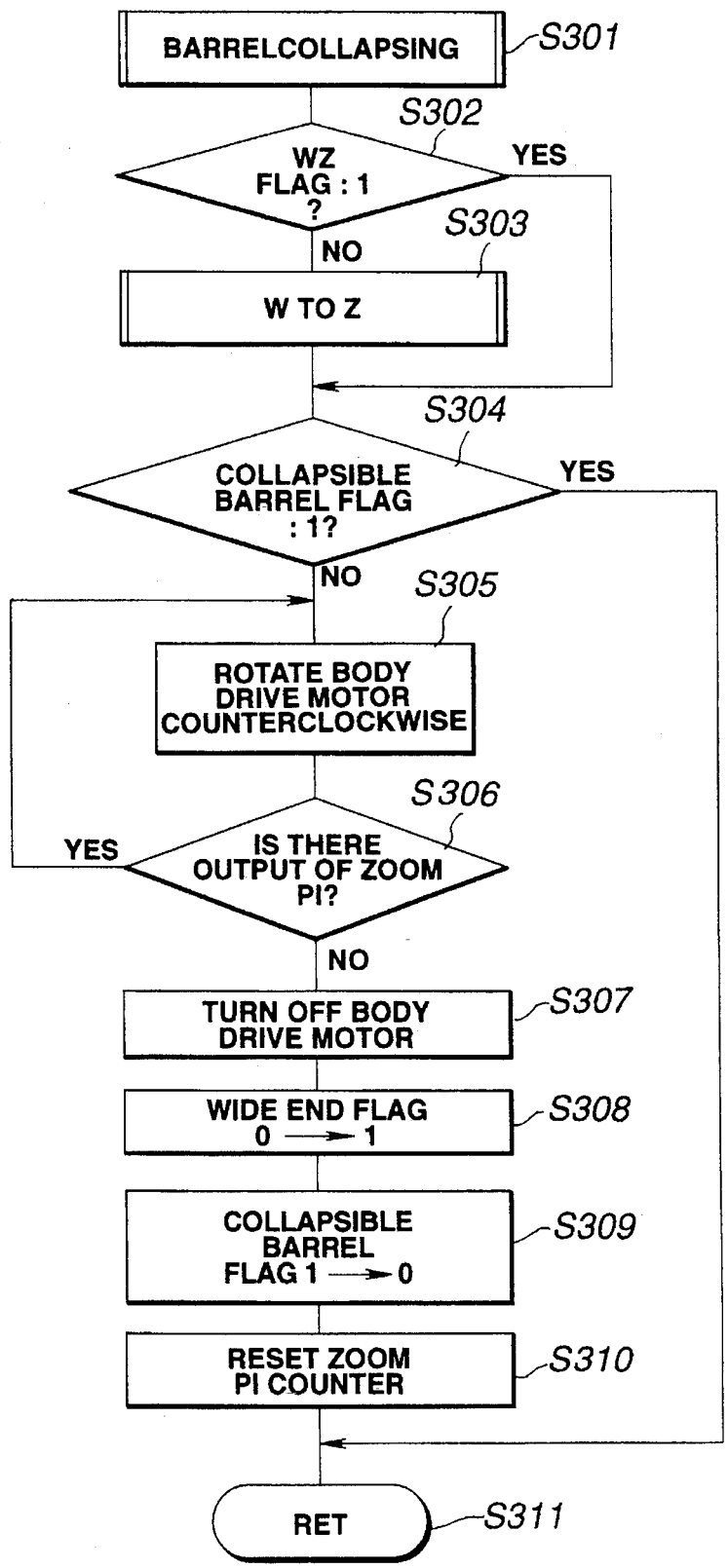
FIG. 28 is a flowchart illustrating an operation for driving the lens frame from a photographic area to its collapsed state in the camera in accordance with the embodiment of the present invention.

FIG. 28 is a flowchart illustrating an operation for driving the lens frame from a photographic area to its collapsed state.

When the power-supply switch (SW) 317 is switched from on to off, the barrel collapsing operation is started (step S301). The barrel collapsing operation is also performed when the film is finished and automatic rewinding is started during the film winding which will be described later (see FIG. 29), and during the rewinding operation (see FIG. 30) when the forced rewinding switch (SW) 322 is turned on.

The barrel collapsing operation is performed after the gear trains are properly switched to the lens frame drive side in the same manner as in the extension operation shown in FIG. 25, and the operation is terminated when it is determined that the barrel collapsing is completed when the output of the zoom PI stops changing. The details will be explained below.

Initially, a check is made to determine if the planetary gear 203 is connected to the lens frame drive side, that is, if the WZ flag is 1 (step S302). If the planetary gear 203 is not connected to the lens frame drive side, the subroutine (W to Z) for switching the carrier 204 to the lens frame drive side is performed (step S303).

Thereafter, a check is made to determine if the barrel collapsing flag is 1 (step S304). If the flag is 1, the process returns to the main routine (step S311). If the flag is not 1, the body drive motor 201 is rotated in the counterclockwise direction until there is an output from the zoom PI 213 (steps S305 and S306) so that the lens frame is moved to the barrel collapsing position.

Thereafter, the body drive motor 201 is turned off (step S307), after which the wide end flag is changed from 0 to 1 (step S308), and the barrel collapsing flag is changed from 1 to 0. Further, the zoom counter is reset (step S310), and then the process returns to the main routine (step S311).

Figure 29:
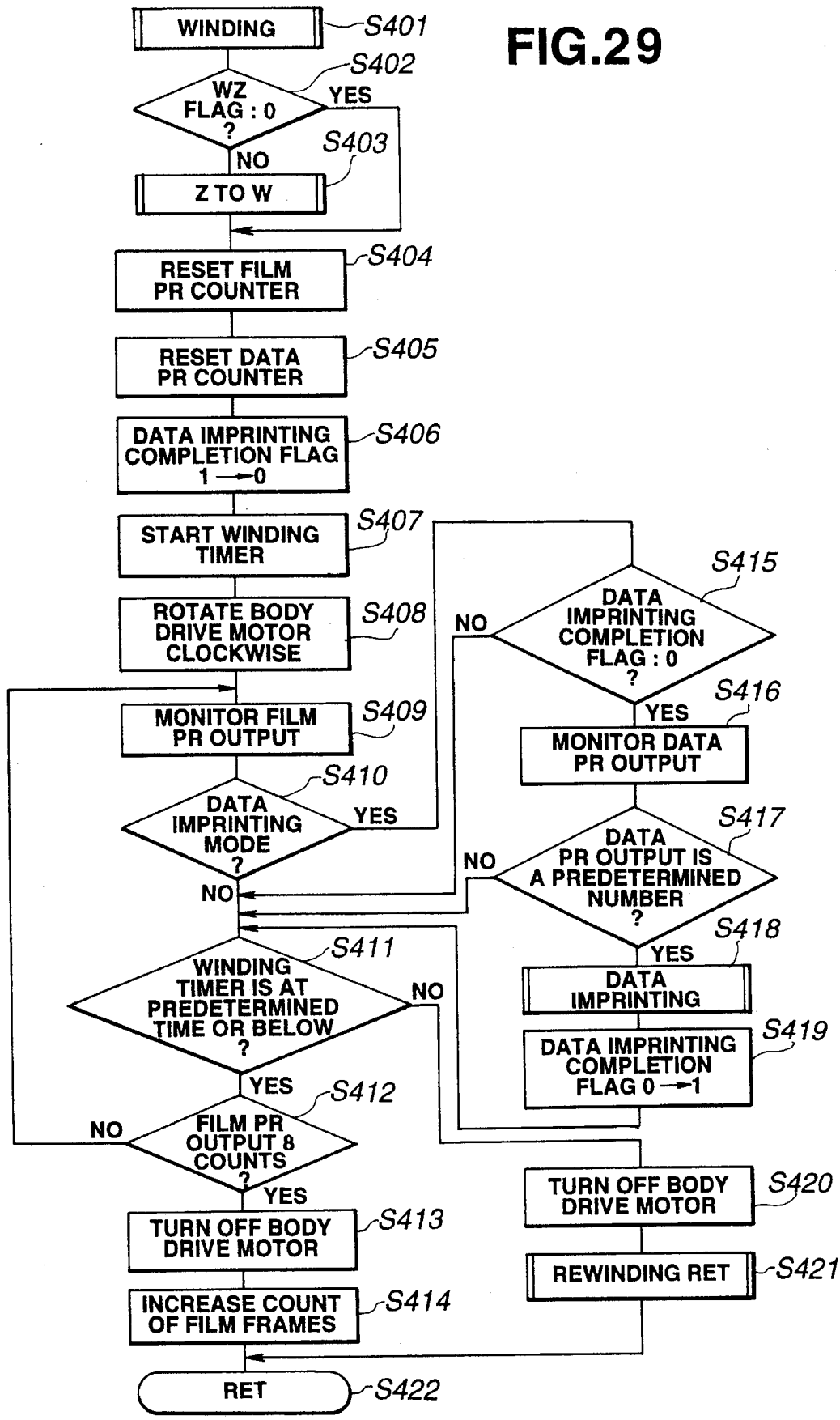
FIG. 29 is a flowchart illustrating an operation for winding one frame of film in the camera in accordance with the embodiment of the present invention.

FIG. 29 is a flowchart illustrating an operation for winding one frame of film.

The turning on of the release switch (SW) 318 actuates the shutter plunger 99, and the winding operation is started after the film exposure operation is completed (step S401). Initially, a check is made to determine if the planetary gear 203 is connected to the film drive side, that is, if the WZ flag is 0 (step S402). If the planetary gear 203 is not connected to the film drive side, the subroutine (Z to W) for switching the carrier 204 to the film drive side is performed (step S403), and then the winding operation is started.

Further, when it is determined that the camera is in the data imprinting mode on the basis of the status of a data imprinting mode switching switch (SW) 323, the data imprinting operation is performed during the winding of the film (steps S404 to S406). The film winding operation is terminated when 8 perforations of the film are passed, or the end of the film is taken up and a predetermined time determined by a winding timer has passed while monitoring the output from the film PR 249 (steps S407 to S422).

Figure 30:
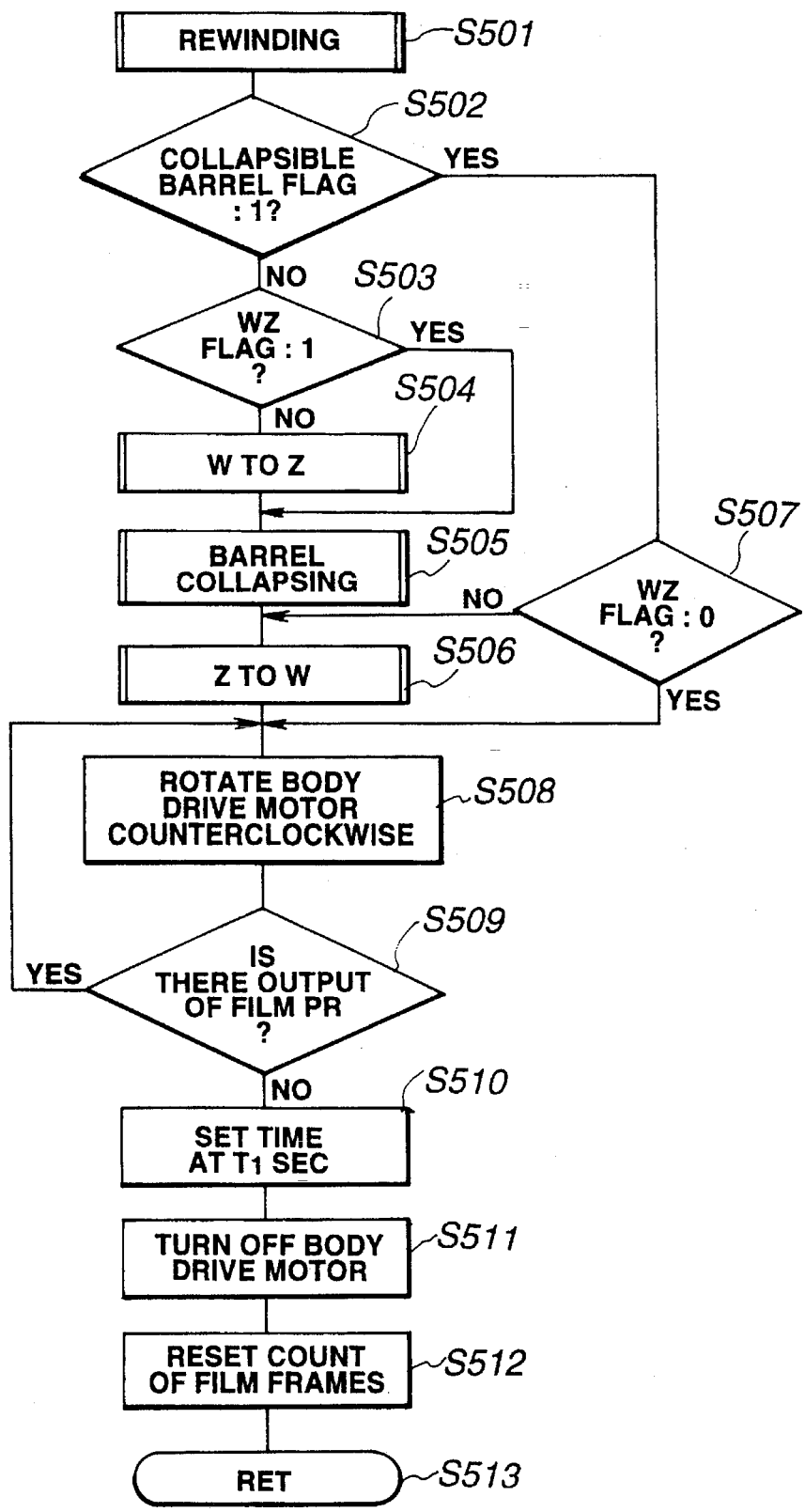
FIG. 30 is a flowchart illustrating an operation for rewinding the film in the camera in accordance with the embodiment of the present invention.

FIG. 30 is a flowchart illustrating an operation for rewinding the film.

The rewinding operation is started when the film has been taken up to the end thereof or the forced rewinding switch (SW) 322 is turned on while the winding operation shown in FIG. 29 is being performed (step S501).

In the rewinding operation, the lens frame is first put in a barrel collapsed state in order to make the panoramic planetary gear 220 be engaged with the first rewinding gear 224 and then the subroutine (Z to W) for switching the carrier 204 to the film drive side is performed (steps S502 to S507). Thereafter, the rewinding operation is performed.

More specifically, the body drive motor 201 is rotated in the counterclockwise direction until the output from the film PR 249 is no longer detected (steps S508 and S509), the timer is set at T1 sec (step S510), and the body drive motor 201 is turned on (step S511). Thereafter, the count of the number of frames of film is reset (step S512), and then the process returns to the main routine (step S513).

Figure 31:
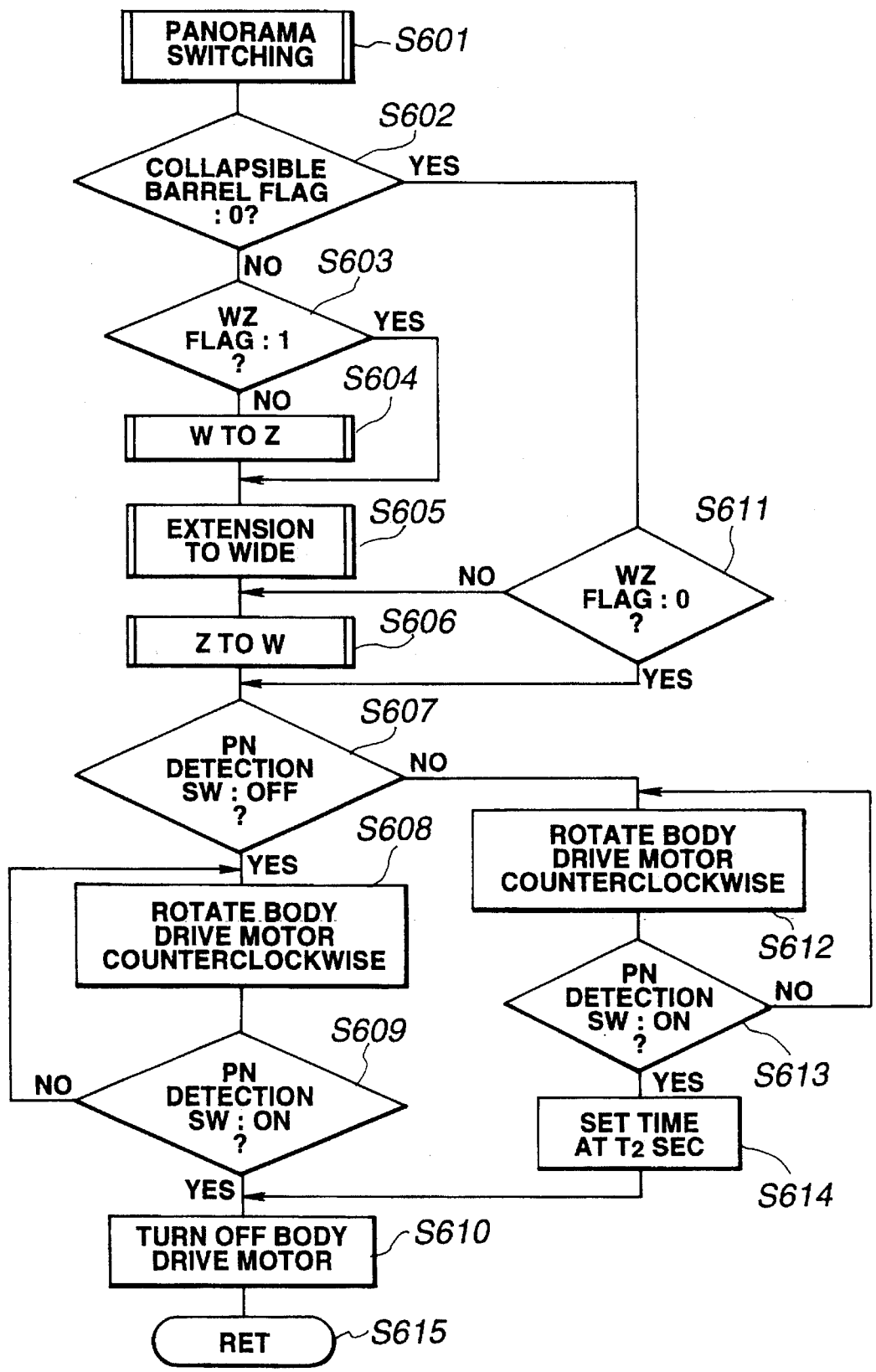
FIG. 31 is a flowchart illustrating an operation for switching the photographic image plane between the normal size and the panoramic size in the camera in accordance with the embodiment of the present invention.

FIG. 31 is a flowchart illustrating an operation for switching the photographic image plane between the normal size and the panoramic size (hereinafter referred to as the panoramic switching operation).

The panoramic switching operation is started when the status of the panoramic switching switch (SW) 321 varies (step S601). In the switching operation, first, it is confirmed that the lens frame has been extended to the possible photographic area, or the lens frame is extended to the possible photographic area. Next, the carrier 204 is switched to the film drive side (steps S602 to S606, and step S611).

Thereafter, by monitoring the change in the status of the PN detection switch (SW) 245, the image-plane size is switched (steps S607 to S615). The timer (T2 sec) in step S614 is a timer for ensuring that after the PN detection switch (SW) 245 is switched from on to off, the cam gear 222 is rotated and the image-plane size is properly switched to the normal size.

Figure 32:
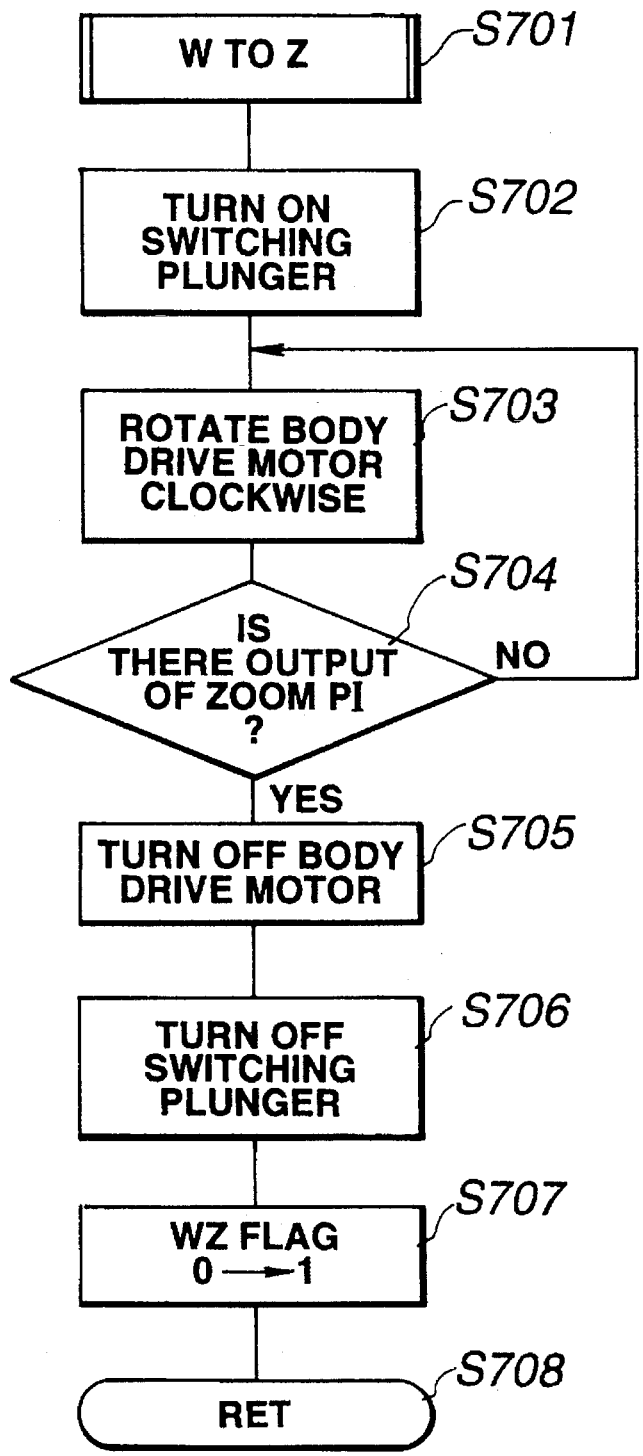
FIG. 32 is a flowchart illustrating a subroutine "W to Z" of an operation for rotating a carrier 204 to switch a planetary gear 203 from a film drive side to a lens frame drive side.

FIG. 32 is a flowchart illustrating a subroutine "W to Z" (step S701) of an operation for making the carrier 204 be rotated to switch the planetary gear 203 from the film drive side to the lens frame drive side.

Initially, the switching plunger 206 is turned on (step S702), and the body drive motor 201 is rotated in the clockwise direction until there is an output from the zoom PI 213 (steps S703 and S704). Thereafter, the body drive motor 201 is turned off (step S705), the switching plunger 206 is turned off (step S706), the WZ flag is changed from 0 to 1 (step S707), and the process returns to the main routine (step S708).

Figure 33:
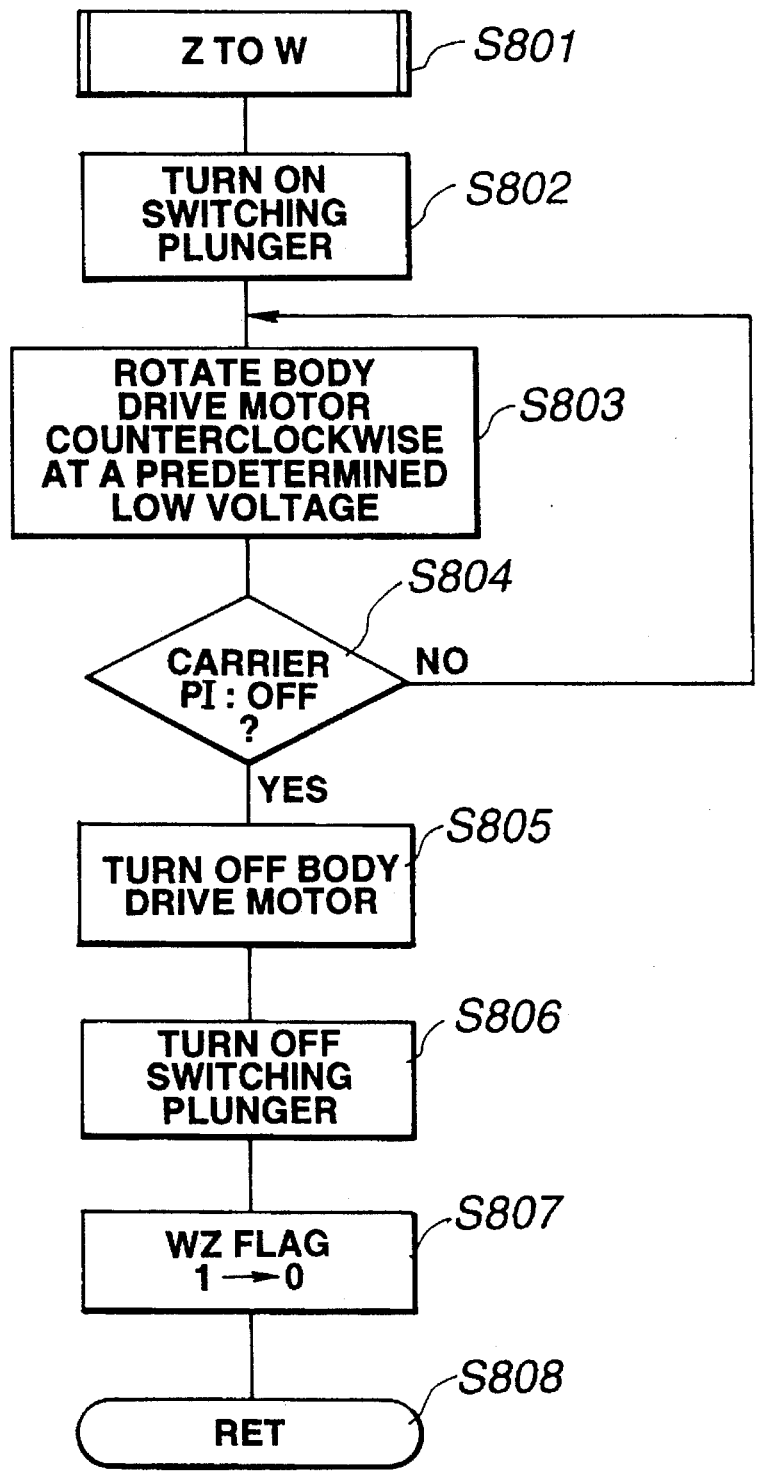
FIG. 33 is a flowchart illustrating the subroutine "W to Z" of an operation for rotating a carrier 204 to switch the planetary gear 203 from the lens frame drive side to the film drive side.

FIG. 33 is a flowchart illustrating the subroutine "Z to W" (step S801) of an operation for making the carrier 204 be rotated to switch the planetary gear 203 from the lens frame drive side to the film drive side.

Initially, the switching plunger 206 is turned on (step S802). Then, the body drive motor is operated at a predetermined low voltage by which the film 13 cannot be taken up because if the driving force of the body drive motor 201 at switching time is large, the spool 217 rotates when the switching is completed and the film 13 is taken up (step S803). The above operation is performed by the bipolar IC 402 and the shutter plunger drive circuit 491 when a drive voltage set signal is output from the main CPU 401 to the bipolar IC 402. The switching operation is terminated when the output from the carrier PI 207 reaches the "L" level (steps S804 to S808).

Figure 34:
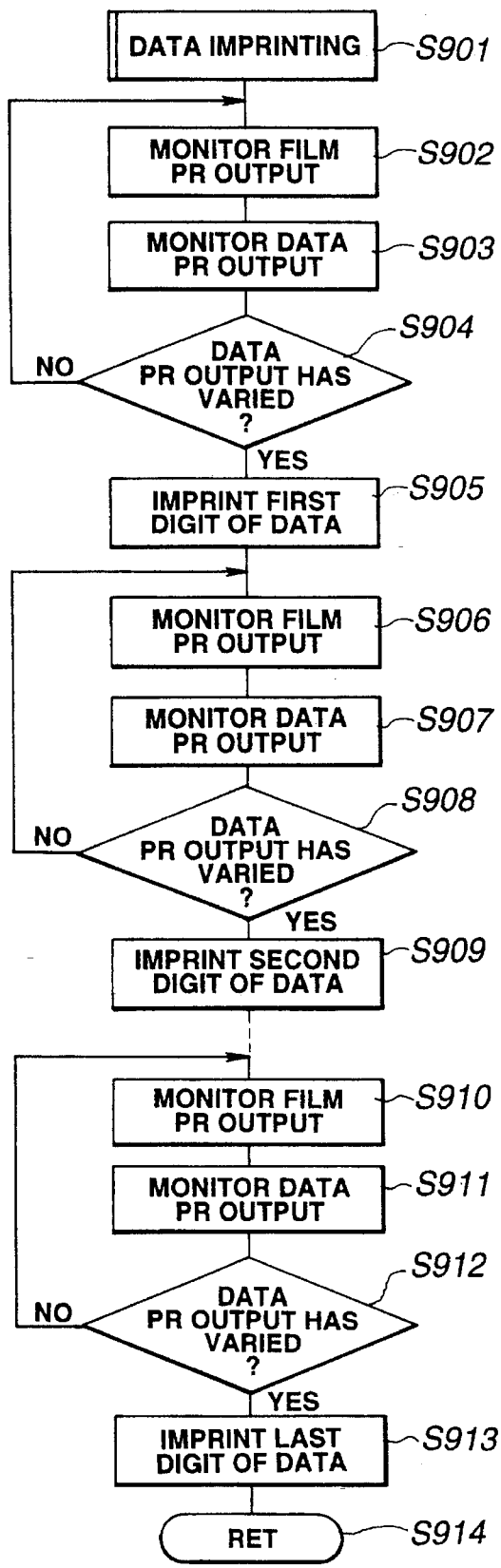
FIG. 34 is a flowchart illustrating a data imprinting operation in the camera in accordance with the embodiment of the present invention.

FIG. 34 is a flowchart illustrating a data imprinting operation.

When the subroutine for imprinting data starts (step S901), first, the outputs from the film PR 249 and the data PR 261 are monitored until the output from the data PR 261 varies (steps S902 to S904). After the output from the data PR 261 varies, the first order of data is imprinted on the film (step S905).

Thereafter, again, the outputs from the film PR 249 and the data PR 261 are monitored until the output from the data PR 261 varies (steps S906 to S908), and the second order of the data is imprinted on the film after the output from the data PR 261 varies (step S909). Further, a series of these operations are repeated until the last order of the data is imprinted (steps S910 to S913).

The data is imprinted one after another on the film in the above-described way, and the data imprinting subroutine is terminated (step S914).

According to the embodiment, as described above, it is possible to realize a high-accuracy film detection mechanism which is small and simple in construction.

In this invention, it is apparent that working modes which differ over a wide range can be formed on this basis of this invention without departing from the spirit and scope of the invention. This invention is thus not restricted by any specific embodiment except as limited by the appended claims.

What is claimed is:

1. A film feeding amount detection apparatus of a camera, comprising:

roller means which is rotated responsive to movement of a film;

reflecting means which shares a common rotation shaft with the roller means and which is formed into a polygonal-shaped pillar such that a plurality of reflecting surfaces are formed on an outer periphery of the pillar; and light projection and receiving means, disposed at a position facing the reflecting surfaces formed on the reflecting means, for respectively projecting light to the reflecting surfaces and receiving light reflected back therefrom for generating pulses responsive to movement of the film.

2. A film feeding amount detection apparatus of a camera according to claim 1, wherein said light projection and receiving means is a photoreflector.

3. A film feeding amount detection apparatus of a camera according to claim 1, wherein said reflecting means and said roller means are connected in a predetermined interlocking relation.

4. A film feeding amount detection apparatus of a camera according to claim 1, wherein said roller means is disposed in a vicinity of an entrance to a spool compartment by which a film feeding passage in which the film is fed substantially parallel to a photographic image plane is changed in a direction of an interior of the spool compartment.

5. A film feeding amount detection apparatus of a camera according to claim 4, wherein said roller means is disposed to contact a surface portion of the film displaced from perforations provided in the film.

6. A film feeding amount detection apparatus of a camera according to claim 1, wherein said roller means is disposed to contact a surface portion of the film displaced from and outside of perforations provided in the film.

7. A film feeding amount detection apparatus of a camera according to claim 1, wherein said roller means contacts a surface portion of the film other than a band-like exposed area including a photographic image plane.

8. A film feeding amount detection apparatus of a camera according to claim 1, wherein said reflecting means on which a plurality of reflecting surfaces are formed is formed into a regular polygonal pillar shape.

9. A camera having the film feeding amount detection apparatus according to claim 1, comprising:
    data imprinting means for imprinting photographic data on a film; and
    timing control means for controlling imprinting timing of said data imprinting means in synchronization with a signal from said light projection and receiving means for imprinting data during feeding of the film.

10. A camera according to claim 9, wherein said light projection and receiving means is a photoreflector.

11. A camera according to claim 9, wherein said timing control means controls said data imprinting means in such a way that said data imprinting means causes predetermined data to be exposed on said film once each time there is an output from said photoreflector, and imprinting of data within one image plane terminates when a predetermined number of data exposures have occurred.

12. A camera according to claim 1, wherein said roller means is provided with pressing means for pressing the film against said roller means when said roller means rotates in a driven manner with respect to movement of the film.

13. A camera having a data recording apparatus, comprising:
    a rotary member which rotates in response to movement of a film; and
    detecting means for detecting an amount of film fed, which has a reflecting section having a plurality of reflecting surfaces, which section moves with rotation of the rotary member, light projection means for projecting light onto the reflecting surfaces and light receiving means for receiving light reflected back from the reflecting surfaces for generating pulses responsive to film movement.

14. A camera according to claim 13, wherein said reflecting surface is formed of a resin member.

15. A camera according to claim 13, wherein said reflecting surface is formed on the circumference of said rotary member.

16. A camera according to claim 13, further comprising pressing means for pressing said film against said rotary member.

17. A camera having a data recording apparatus, comprising:
    a rotary member having a plurality of reflecting sections, each section having a reflecting surface which reflects light and rotates in response to movement of a film;
    light projection means for projecting light toward said reflecting surfaces; and
    light receiving means for receiving light reflected from a reflecting surface for generating signals responsive to film movement; and
    data imprinting means for imprinting data onto the film responsive to said signals.

18. A camera according to claim 17, wherein said reflecting surface is formed of a resin member.

19. A camera according to claim 17, wherein said reflecting surface is formed on the circumference of said rotary member.

20. A camera according to claim 17, further comprising pressing means for pressing said film against said rotary member.

21. A camera having a data recording apparatus, comprising:
    a rotary member which rotates in response to movement of a film;
    a plurality of reflecting sections each having a reflecting surface which reflects light, said sections moving in response to rotation of said rotary means;
    light projection means for projecting light onto a reflecting surface; and
    light receiving means for receiving light reflected from a reflecting surface for generating signals representing film movement;
    detecting means responsive to said signals for detecting an amount of movement of the film;
    data imprinting means for imprinting data on the film; and
    control means for controlling said data imprinting means responsive to signals from said detecting means.

22. A camera according to claim 21, wherein said reflecting surface is formed of a resin member.

23. A camera according to claim 21, wherein said reflecting surface is formed on the circumference of said rotary member.

24. A film feeding amount detecting apparatus of a camera, comprising:
    a rotary member having reflecting surfaces on sides of a polygonal-shaped pillar and which rotates responsive to movement of the film; and
    photoreflectors disposed at positions facing the reflecting surfaces provided on the sides of said polygonal pillar in a one-to-one correspondence.

25. A detection apparatus of a camera, comprising:
    first rotation means which rotates responsive to a moving member;
    second rotation means which is formed into a polygonal-shaped pillar having a plurality of reflecting surfaces formed on an outer periphery thereof and which rotates in unison with said rotation means; and
    light projection and receiving means, disposed at a position facing the reflecting surfaces formed on said second rotation means, for respectively projecting light onto a reflecting surface and receiving light reflected therefrom for generating signals responsive to movement of said member.

26. A method for sequentially imprinting data on a photographing film in a camera having a pillar with a plurality of reflecting surfaces and being arranged to rotate with a rotatable roller engaging a surface of the film and imprinting means for imprinting a character on the film comprising the steps of:

(a) advancing the film in conjunction with a photographing operation to rotate said roller and said pillar;

(b) directing a beam toward the reflecting surfaces of the pillar;

(c) detecting a beam reflected from reflecting surfaces of the pillar;

(d) activating the imprinting means responsive to each reflected beam; and (e) halting activation of the imprinting means when a desired number of characters have been imprinted.

27. The method of claim 26 wherein step (c) further comprises the step of counting the reflected beams; and halting advancing of the film when a count representing advancing of one film frame is reached.

28. The method of claim 26 wherein said (d) further comprises controlling the imprinting means to select a desired character with each activation of the imprinting means.

29. A film feeding amount detection apparatus of a camera, comprising:

a film feeding path feeding a film substantially in parallel with a photographic image plane;

roller means, disposed at an end of said film feeding path, for supporting a film when a direction of the film from said film feeding path is changed to a direction deviated by a specified angle with respect to a photographic optical-axis direction, said roller means being moved and rotated by pressure applied by the film due to movement and change of direction of the film;

reflecting means which shares a common rotation shaft with said roller means and which is formed into a polygonal pillar shape such that a plurality of reflecting surfaces are provided on an outer periphery of said pillar; and light projection and receiving means, disposed at a position facing the reflecting surfaces formed on the reflecting means, for projecting light to the reflecting surfaces and receiving light reflected back therefrom to generate signals responsive to film movement.

30. A film feeding amount detection apparatus of a camera, comprising:

a film feeding path feeding a film substantially in parallel with a photographic image plane;

roller means, disposed at an end of said film feeding path, for supporting a film when a direction of the film from said film feeding path is changed to a direction deviated by a specified angle with respect to a photographic optical-axis direction, said roller means being moved and rotated by pressure applied by the film due to movement and change of direction of the film;

reflecting means which shares the use of a common rotation shaft with said roller means and which is formed into a polygonal shaped pillar such that a plurality of reflecting surfaces are provided on a periphery of said pillar; and photoreflectors disposed at positions facing the reflecting surfaces provided on said reflecting means, said photoreflectors projecting light on the reflecting surfaces and receiving reflected light therefrom for generating signals representing film movement;

data imprinting means for imprinting photographic data on the film; and imprinting timing control means for controlling said data imprinting means so that predetermined data are exposed once on the film in every output of said photoreflectors to be capable of imprinting data while the film is fed and so that imprinting of data within one image plane terminates when a predetermined number of exposures are have been performed.

* * * * *